US008788803B2

(12) United States Patent
Irvine

(10) Patent No.: US 8,788,803 B2
(45) Date of Patent: Jul. 22, 2014

(54) SELF-ENCRYPTION PROCESS

(75) Inventor: David Irvine, Ayshire (GB)

(73) Assignee: Maidsafe Foundation, Ayrshire (GB)

( * ) Notice: Subject to any disclaimer, the term of this patent is extended or adjusted under 35 U.S.C. 154(b) by 0 days.

(21) Appl. No.: 13/362,384

(22) Filed: Jan. 31, 2012

(65) Prior Publication Data
US 2012/0210120 A1 Aug. 16, 2012

Related U.S. Application Data

(63) Continuation of application No. 12/476,229, filed on Jun. 1, 2009, now abandoned, which is a continuation of application No. PCT/GB2007/004421, filed on Nov. 21, 2007.

(30) Foreign Application Priority Data

Dec. 1, 2006 (GB) .................................. 0624053.5
May 22, 2007 (GB) .................................. 0709759.5

(51) Int. Cl.
    G06F 21/00 (2013.01)
(52) U.S. Cl.
     USPC .......................................... 713/150; 713/151
(58) Field of Classification Search
     CPC ............ H04L 63/0428; H04L 67/1095; H04L 9/0637; H04L 9/0838; H04L 9/0841; H04L 9/34; G06Q 10/10; G06Q 20/206; Y10S 707/99932; Y10S 707/99953; Y10S 707/959; G06F 17/30097; G06F 21/6272; G06F 21/64; G06F 21/645
     See application file for complete search history.

(56) References Cited

U.S. PATENT DOCUMENTS

| 6,192,129 B1 | 2/2001 | Coppersmith et al. |
| 6,205,533 B1 | 3/2001 | Margolus |
| 2002/0032691 A1* | 3/2002 | Rabii et al. ................... 707/200 |
| 2002/0038296 A1* | 3/2002 | Margolus et al. ................. 707/1 |
| 2002/0106192 A1* | 8/2002 | Sako .............................. 386/94 |
| 2002/0194209 A1 | 12/2002 | Bolosky |
| 2003/0187853 A1* | 10/2003 | Hensley et al. ................. 707/10 |

(Continued)

FOREIGN PATENT DOCUMENTS

EP 1694027 8/2006

OTHER PUBLICATIONS

European Search Report, Patent Application No. EP 12 15 5329, May 23, 2012, 4 pages, Munich.

(Continued)

Primary Examiner — Michael S McNally
Assistant Examiner — Carlton Johnson
(74) Attorney, Agent, or Firm — Gardner Groff Greenwald & Villanueva, PC

(57) ABSTRACT

This invention is a network that is defined by its novel approach to privacy, security and freedom for its users. Privacy by allowing access anonymously, security by encrypting and obfuscating resources and freedom by allowing users to anonymously and irrefutably be seen as genuine individuals on the network and to communicate with other users with total security and to securely access resources that are both their own and those that are shared by others with them. The functional mechanisms that this invention provides will restore open communications and worry-free access in a manner that is very difficult to infect with viruses or cripple through denial of service attacks and spam messaging, plus, it will provide a foundation where vendor lock-in need not be an issue.

13 Claims, 28 Drawing Sheets

(56) References Cited

U.S. PATENT DOCUMENTS

| | | | |
|---|---|---|---|
| 2004/0131181 A1* | 7/2004 | Rhoads | 380/37 |
| 2005/0091234 A1* | 4/2005 | Hsu et al. | 707/100 |
| 2007/0250700 A1* | 10/2007 | Sidhu et al. | 713/150 |

OTHER PUBLICATIONS

Australian Patent Examination Report No. 2, Patent Application No. 20077327389, Apr. 30, 2013, 4 pages, Melbourne.

\* cited by examiner

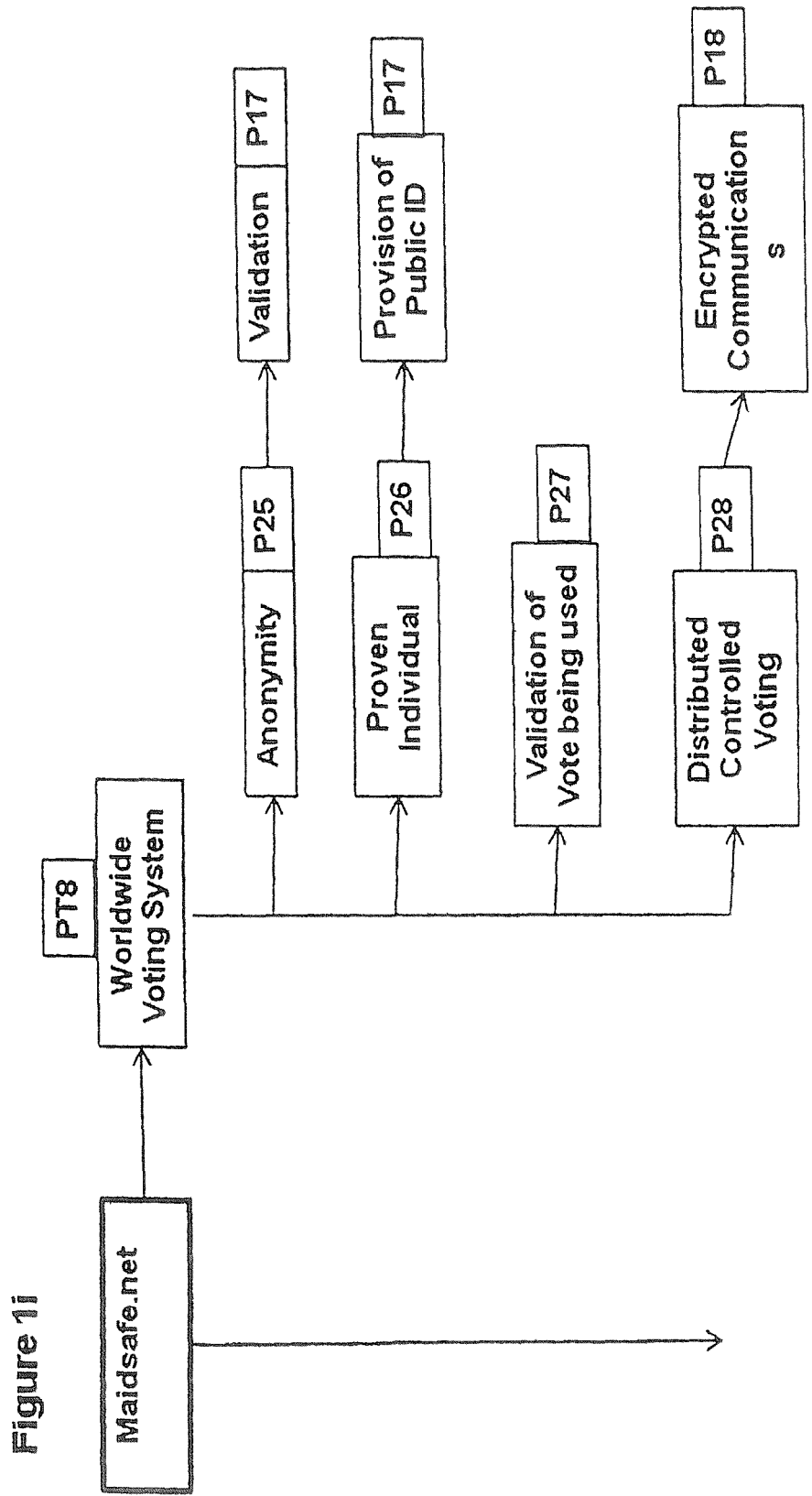

Self Authentication Detail

Peer to Peer Schematic

Authentication Flowchart

Data Assurance Event Sequence

Chunking Event Sequence

Chunking Example

Self Healing Event Sequence

Peer Ranking Event Sequence

Duplicate Removal Event Sequence

Perpetual Data

Chunk Checks

Storage of Additional Chunks

Self Healing

Aput

Aforget

Self Encrypting Files

Shared Access to Private Files ms Messenger

Worldwide Voting

SELF-ENCRYPTION PROCESS

CROSS REFERENCE TO RELATED APPLICATIONS

This application is a continuation of U.S. Non-Provisional Patent application Ser. No. 12/476,229, filed Jun. 1, 2009 now abandoned, which is a continuation of International Application PCT/GB2007/004421 with an International Filing Date of Nov. 21, 2007, and claiming priority to co-pending Great Britain Patent Application No. 0624053.5 filed on Dec. 1, 2006 and co-pending Great Britain Patent Application No. 0709759.5 filed May 22, 2007, all of which are relied on and incorporated herein by reference.

STATEMENT OF INVENTION

An issue with today's networks is a combination of vendor lock in, imposed vendor based controls and lack of standards. The present 3 invention allows users to take charge of a new global network in a 4 manner that will maintain effectiveness and promote the setting and 5 attaining of common goals.

Another issue with today's networks is the security and privacy of data, 7 this invention allows a secure private and free network where users can 8 enjoy an efficiently managed working environment that presents a 9 guaranteed level of private and securely protected activity.

Also today, many computer resources are under utilised to a great 1 degree, including disk space, memory, processing power and any other 2 attached resources, this is inefficient and environmentally detrimental. 3 The present invention seeks to maximise these resources and share 4 them globally to people who purchase them or to people or 5 organisations who are deemed appropriate to benefit from them, such as children in poorer countries, science labs etc. Allocation from these 7 resource pools, together with other resources, will be decided by the 8 users of the system.

BACKGROUND

Digital data is often stored on the hard disks of individual PCs which 0 invariably have memory and operational overhead restrictions. Storage on distributed systems such as the internet is also possible but requires specific storage servers to be available. In addition to these physical systems, data management elements such as security, repair, encryption, authentication, anonymity and mapping etc. are required to ensure successful data transactions and management via the Internet. Systems of messaging and voting exist today but do not allow either authentication on what was voted for or on line anonymity. There have been some attempts as listed below, but none of these systems operate as maidsafe.net does.

Listed below is some prior art for these individual elements, of which we have analysed and rejected as true prior art, where necessary we indicate why it is not prior art for our invention:

Most perpetual data generation is allocated with time & calendar etc. (US62669563, JP2001100633). This is not related to this current invention as we have no relation to calendaring, which demonstrates perpetual generation time related data. However, External devices as communication terminal (JP2005057392) (this is a hardware device not related to this present invention) have been used for plurality of packet switching to allow perpetual hand-ff of roaming data between networks and battery pack (EP0944232) has been used to around-the-clock accessibility of customer premises equipment interconnected to a broadband network is enhanced by perpetual mode operation of a broadband network interface. In addition, perpetual data storage and retrieval in reliable manner in peer to peer or distributed network The only link here is these devices are connected to Internet connections but otherwise presents no prior art.

Patents WO9637837, TW223167B, U.S. Pat. No. 6,760,756 and U.S. Pat. No. 7,099,898 describe methods of data replication and retention of data during failure.

Patent WO200505060625 discloses method of secure interconnection when failure occurs.

Authentication servers are for user and data transaction authentication e.g. JP2005311545 which describe a system wherein the application of 'a digital seal' to electronic documents conforms to the Electronic Signature Act. This is similar to the case of signing paper documents but uses the application of an electronic signature through an electronic seal authentication system. The system includes: client computers, to each of which a graphics tablet is connected; an electronic seal authentication server and a PKI authentication server, plus the electronic seal authentication server. US2004254894 discloses an automated system for the confirmed efficient authentication of an anonymous subscriber's profile data in this case.

JP2005339247 describes a server based one time ID system and uses a portable terminal. US2006136317 discloses bank drop down boxes and suggests stronger protection by not transmitting any passwords or IDs. Patent US2006126848 discloses a server centric and deals with a one time password or authentication phrase and is not for use on a distributed network. Patent US2002194484 discloses a distributed networks where all chunks are not individually verified and where the manifest is only re-computed after updates to files and hashes are applied and are for validation only.

This is mostly used in biometric (WO2006069158). System for generating a patch file from an old version of data which consists of a series of elements and a new version of data which also consists of a series of elements US2006136514). Authentication servers (therefore not a distributed networking principle as per this invention) are commonly used (JP2006107316, US2005273603, EP1548979).

However, server and client exchange valid certificates can be used (US2004255037). Instead of server, uses of information exchange system (semantic information) by participant for authentication can be used (JP2004355358), again this semantic information is stored and referenced unlike this present invention.

Concepts of identity-based cryptography and threshold secret sharing provides for a distributed key management and authentication. Without any assumption of pre-fixed trust relationship between nodes, the ad hoc network works in a self-organizing way to provide the key generation and key management service, which effectively solves the problem of single point of failure in the traditional public key infrastructure (PKI)-supported system (US2006023887). Authenticating involves encryption keys for validation (WO2005055162) These are validated against known users unlike the present invention. Also, for authentication external housing are used (WO2005034009). All of these systems require a lost or (whether distributed or not) record of authorised users and pass phrases or certificates and therefore do not represent prior art.

Ranking, hashing for authentication can be implemented step-by-step and empirical authentication of devices upon digital authentication among a plurality of devices. Each of a plurality of authentication devices can unidirectionally generate a hash value of a low experience rank from a hash value of a high experience rank, and receive a set of high experience rank and hash value in accordance with an experience. In this way, the authentication devices authenticate each other's experience ranks (US2004019788). This is a system of hashing access against known identities and providing a mechanism of effort based access. This present invention does not rely or use such mechanisms.

This is another method for authentication (JP2001308845). Self-verifying certificate for computer system, uses private and public keys—no chunking but for trusted hardware subsystems (US2002080973) this is a mechanism of self signing certificates for authentication, again useful for effort based computing but not used in this present invention. Other authentication modes are, device for exchanging packets of information (JP2001186186), open key certificate management data (JP10285156), and certification for authentication (WO96139210). Authentication for Peer to Peer system is demonstrated by digital rights management (US2003120928). Digital rights management and CSC (part of that patent s a DRM container) issues which are based on ability to use rather than gaining access to network or resources and therefore not prior art.

Known self-healing techniques are divided broadly into two classes. One is a centralized control system that provides overall rerouting control from the central location of a network. In this approach, the rerouting algorithm and the establishing of alarm collection times become increasingly complex as the number of failed channels increases, and a substantial amount of time will be taken to collect alarm signals and to transfer rerouting information should a large number of channels of a multiplexed transmission system fail. The other is a distributed approach in which the rerouting functions are provided by distributed points of the network. The following papers on distributed rerouting approach have been published. (these are all related to self healing but from a network pathway perspective and therefore are not prior art for this invention which deals with data or data chunks self healing mechanisms.

Document 1: W. D. Grover, "The Selfhealing Network", Proceedings of Grobecom '87, November 1987.
Document 2: H. C. Yang and S. Hasegawa, "Fitness: Failure Immunization Technology For Network Service Survivability", Proceedings of Globecom '88, December 1988.
Document 3: H. R. Amirazizi, "Controlling Synchronous Networks With Digital Cross-Connect Systems", Proceedings of Globecom '88, December 1988.

Document 1 is concerned with a restoration technique for failures in a single transmission system, and Document 2 relates to a "multiple-wave" approach in which route-finding packets are broadcast in multiple wave fashion in search of a maximum bandwidth until alternate routes having the necessary bandwidth are established. One shortcoming of this multiple wave approach is that it takes a long recovery time. Document 3 also relates to fault recovery for single transmission systems and has a disadvantage in that route-finding packets tend to form a loop and hence a delay is likely to be encountered.

This is demonstrated by a system and method of secure and tamperproof remote files over distributed system, redirects integrity check fail data to install module for repairing (WO20566133) This discloser relies on testing data from a central location and not distributed chunking as with the present invention. It also does not allow for multiple access and sharing of the testing and ownership of chunks. Server are used for self-healing (US2004177156), effectively removing these from a prior art claim. Self-repairing is conducted by data overlay is built as a data structure on top of a logical space defined by a distributed hash table (DHT) in a peer-to-peer (P2P) network environment (US2005187946) This Microsoft patent is a patent to DT networks which is peculiar as these exist in some quantity and have done for many years, however there is no claim made to self repair data as is in this present invention but to self repair data storage locations (i.e. in p2p terms find nearest node). This is not self healing data but merely a description of a typical DHT and the availability of routes to data and providing multiple routes. This is not prior art for this present inventions but very likely not enforceable as there are many cases of prior art against this Microsoft patent.

Identical communicating node elements are used for power delivery network for self-repairing (US2005043858). Self-healing also relates to distributed data systems and, in particular, to providing high availability during performance of a cluster topology self-healing process within a distributed data system cluster. A cluster topology self-healing process may be performed in response to a node failure in order to replicate a data set stored on a failed node from a first node storing another copy of the data set to a second non-failed node (US2004066741). An apparatus and method for self-healing of software may rely on a distribution object in a directory services of a network to provide data for controlling distribution of software and installation of files associated therewith (U.S. Pat. No. 6,023,586). A technique for the substantially instantaneous self-healing of digital communications networks. Digital data streams from each of N nearby sources are combined and encoded to produce N+M coded data streams using a coding algorithm. The N+M coded data streams are then each transmitted over a separate long haul communications link to a decoder where any N of the N+M coded data streams can be decoded uniquely to produce the original N data steams (EP0420648. To provide a self-healing communications network which can be recovered from a failure in a short period of time even if the failure has occurred in a multiplexed transmission line (U.S. Pat. No. 5,235,599) The above patents and inventions are based on clustering technology and not distributed computing or Internet based computing. The cluster is simply many machines connected to create a larger machine. It is treated as a single machine with known user access etc. and not prior art to this present invention. The N+M coding schemes discussed are patents based on digital communications and reception links and are not related to this present invention although at first glance they appear to have the same language in areas.

Attempts to moving towards attaining some limited aspects of self-encryption are demonstrated by (a) US2003053053625 discloser shows limitation of asymmetrical and symmetrical encryption algorithms, and particularly not requiring generating a key stream from symmetric keys, nor requiring any time synchronising, with minimal computational complexity and capable of operated at high speed. A serial data stream to be securely transmitted is first demultiplexed into a plurality N of encryptor input data stream. The input data slices are created which have cascade of stages, include mapping & delay function to generate output slices. These are transmitted though a transmission channel. Decryptor applies inverse step of cascade of stages, equalizing delay function and mapping to generate output data slices. The output data streams are multiplexed. The encryptor and decryptor require no synchronizing or timing and operate in simple stream fashion. N:N mapping does not require expensive arithmetic and implemented in table lookup. This provides robust security and efficiency. A significant difference between this approach and prior cipher method is that the session key is used to derive processing parameters (tables and delays) of the encryptor and decryptor in advance of data transmission. Instead of being used to generate a key stream at real-time rates. Algorithm for generating parameters from a session key is disclosed This patent is based on data communications and encrypting data in transit automatically and decrypting automatically at the remote end, this is not related to this present invention.

(b) US2002184485 discloser addresses secure communication, by encryption of message (SSDO-self signing document objects), such that only known recipient in possession of a secret key can read the message and verification of message, such that text and origin of message can be verified. Both capabilities and built into message that can be transmitted over internet and decrypted or verified by computer implementing a document representation language that supports dynamic content e.g. any standard web browser, such that elaborate procedures to ensure transmitting and receiving computers have same software are no longer necessary. Encrypted message or one encoded for verification can carry within itself all information needed to specify the algorithm needed for decryption. This is a patent describing a key pair encryption and validation of same software. This is not used by the present invention where key pairs are used for asymmetric encryption of some data but this is used with the RSA (now out of patent) encryption ciphers and not in the manner described above which is more for validation.

A range of limited methods for self-encryption have been developed e.g. system for radomisation-encryption of digital data sequence with freely selectable (EP1182777) (this is a key generating patent and not self encryption as this current invention shows), use of code key calculation encryption mode but using server (CN 1658553), uses self-test mode (U.S. Pat. No. 6,028,527), encryption system for randomising data signal for transmission (not storing) and reproducing information at a receiver (U.S. Pat. No. 4,760,598), uses private encryption keys into components and sending them to trusted agents (rather than self encryption as per this present invention (JP2005328574), cryptographic system with key escrow feature, rather than self encryption as described in this present invention (U.S. Pat. No. 6,009,177), steps of first encoding one set of message signal with first keyed transformation (U.S. Pat. No. 6,385,316), self-modifying fail-safe password system (U.S. Pat. No. 6,370,649), time-based encrypting method involves splitting voice signal into time intervals, random permutations etc. (RU2120700), uses hardware decryption module (HDM) (US2003046568), realizing data security storage and algorithm storage by means of semiconductor memory device (US2006149972), use certificate from certificate server (US20020428080), use certificates for encryption of communications (EP1422865), use self-service terminal for encryption and transmission of data (US2006020788), method for implementing security communication by encryption algorithm (US2005047597), method of data encryption-block encryption variable length (BEVL) encoding, overcomes weakness of CMEA algorithm) (US2004190712), encrypted cipher code for secure data transmission (CN 1627681) method and system for encrypting streamed data employing fast set-up single use key and self-synchronising (US2005232424) and for security, generate MAC for data integrity, placing electronic signature, use TREM software module (US2004199768)

None of the above systems utilise self encryption as per the present invention and are related to voice and data transmissions, or include hardware controllers or servers.

U.S. Pat. No. 6,859,812 discloses a system and method for differentiating private and shared files, where clustered computers share a common storage resource, Network-Attached Storage (NAS) and Storage Area Network (SAN), therefore not distributed as in this present invention. U.S. Pat. No. 5,313,646 has a system which provides a copy-on-write feature which protects the integrity of the shared files by automatically copying a shared file into user's private layer when the user attempts to modify a shared file in a back layer, this is a different technology again and relies on user knowledge—not anonymous. WO02095545 discloses a system using a server for private file sharing which is not anonymous.

A computer system having plural nodes interconnected by a common broadcast bus is disclosed by U.S. Pat. No. 5,117,350. U.S. Pat. No. 5,423,034 shows how each file and level in the directory structure has network access privileges. The file directory structure generator and retrieval tool have a document locator module that maps the directory structure of the files stored in the memory to a real world hierarchical file structure of files. Therefore not distributed across public networks or anonymous or self encrypting, the present inventions does not use broadcasting in this manner.

Today systems secure transactions through encryption technologies such as Secure Sockets Layer (SSL), Digital Certificates, and Public Key Encryption technologies. The systems today address the hackers through technologies such as Firewalls and Intrusion Detection systems. The merchant certification programs are designed to ensure the merchant has adequate inbuilt security to reasonably assure the consumer their transaction will be secure. These systems also ensure that the vendor will not incur a charge back by attempting to verify the consumer through secondary validation systems such as password protection and eventually, Smart Card technology.

Network firewalls are typically based on packet filtering which is limited in principle, since the rules that judge which packets to accept or reject are based on subjective decisions. Even VPNs (Virtual Private Networks) and other forms of data encryption, including digital signatures, are not really safe because the information can be stolen before the encryption process, as default programs are allowed to do whatever they like to other programs or to their data files or to critical files of the operating system. This is done by (CA247150) automatically creating an unlimited number of Virtual Environments (VEs) with virtual sharing of resources, so that the programs in each VE think that they are alone on the computer. The present invention takes a totally different approach to security and obviates the requirement of much of the above particularly CA2471505. U.S. Pat. No. 6,185,316 discloses security via fingerprint imaging testing bit of code using close false images to deter fraudulent copying, this is different from the present invention in that we store no images at all and certainly not in a database.

There are currently several types of centralised file storage systems that are used in business environments. One such system is a server-tethered storage system that communicates with the end users over a local area network, or LAN. The end users send requests for the storage and retrieval of files over the LAN to a file server, which responds by controlling the storage and/or retrieval operations to provide or store the requested files. While such a system works well for smaller networks, there is a potential bottleneck at the interface between the LAN and the file storage system.

Another type of centralised storage system is a storage area network, which is a shared, dedicated high-speed network for connecting storage resources to the servers. While the storage area networks are generally more flexible and scalable in terms of providing end user connectivity to different server-storage environments, the systems are also more complex.

The systems require hardware, such as gateways, routers, switches, and are thus costly in terms of hardware and associated software acquisition.

Yet another type of storage system is a network attached storage system in which one or more special-purpose servers handle file storage over the LAN.

Another file storage system utilizes distributed storage resources resident on various nodes, or computers, operating on the system, rather than a dedicated centralised storage system. These are distributed systems, with the clients communicating peer-to-peer to determine which storage resources to allocate to particular files, directories and so forth. These systems are organized as global file stores that are physically distributed over the computers on the system. A global file store is a monolithic file system that is indexed over the system as, for example, a hierarchical directory. The nodes in the systems use Byzantine agreements to manage file replications, which are used to promote file availability and/or reliability. The Byzantine agreements require rather lengthy exchanges of messages and thus are inefficient and even impractical for use in a system in which many modifications to files are anticipated. US200211434 shows a peer-to-peer storage system which describes a storage coordinator that centrally manages distributed storage resources. The difference here is the requirement of a storage broker, making this not fully distributed. The present invention also differs in that the present invention has no central resources for any of the system and we also encrypt data for security as well as the self healing aspect of our system which is again distributed.

U.S. Pat. No. 7,010,532 discloses improved access to information stored on a storage device. A plurality of first nodes and a second node are coupled to one another over a communications pathway, the second node being coupled to the storage device for determining meta data including block address maps to file data in the storage device.

JP2003273860 discloses a method of enhancing the security level during access of an encrypted document including encrypted content. A document access key for decrypting an encrypted content within an encrypted document is stored in a management device, and a user device wishing to access the encrypted document transmits its user ID and a document identification key for the encrypted document, which are encrypted by a private key, together with a public key to the management device to request transmission of the document access key. Differing from this invention in that it never transmit user id or login in the network at all. Also it does not require management devices of any form.

JP2002185444 discloses improves security in networks and the certainty for satisfying processing requests. In the case of user registration, a print server forms a secret key and a public key, and delivers the public key to a user terminal, which forms a user ID, a secret key and a public key, encrypts the user ID and the public key by using the public key, and delivers them to the print server. This is not linked at all to this invention and is a system for a PKI infrastructure for certificate access to network nodes.

The private and public keys of users are used in U.S. Pat. No. 6,925,182, and are encrypted with a symmetric algorithm by using individual user identifying keys and are stored on a network server making it a different proposition from a distributed network US2005091234 describes data chunking system which divides data into predominantly fixed-sized chunks such that duplicate data may be identified. This is associated with storing and transmitting data for distributed network. US2006206547 discloses a centralised storage system, whilst US2005004947 discloses a new PC based file system.

US2005256881 discloses data storage in a place defined by a path algorithm. This is a server based duplicate removal and not necessarily encrypting data, unlike the present invention which does both and requires no servers.

Common email communications of sensitive information is in plain text and is subject to being read by unauthorized code on the senders system, during transit and by unauthorized code on the receiver's system. Where there is a high degree of confidentially required, a combination of hardware and software secures data. A high degree of security to a computer or several computers connected to the Internet or a LAN as disclosed in US2002099666. Hardware system is used which consists of a processor module, a redundant non-volatile memory system, such as dual disk drives, and multiple communications interfaces. This type of security system must be unlocked by a pass phrase to access data, and all data is transparently encrypted, stored, archived and available for encrypted backup. A system for maintaining secure communications, file transfer and document signing with PKI, and a system for intrusion monitoring and system integrity checks are provided, logged and selectively alarmed in a tamper-proof, time-certain manner.

WO2005093582 discloses method of encryption where data is secured in the receiving node via private tag for anonymous network browsing. However, other numerous encryption methods are also available such as (i) implantation of Reed Solomon algorithm (WO02052787), which ensures data is coded in parabolic fashion for self-repairing and storage, (ii) storage involves incremental backup (WO02052787), (ii) uses stenographic (US2006177094), (iv) use cipher keys (CN1620005), encryption for non text (US2006107048) and US2005108240 discloses user keys and randomly generated leaf node keys. The present invention uses none of these methods of encryption and in particular ensures all chunks are unique and do not point to another for security (an issue with Reed Solomon and N+K implementations of parabolic coding)

WO2005060152 discloses a digital watermark representing the one-way hash is embedded in a signature document is used for electronic signing. Mostly encrypted document signing is associated with legal documents, e.g. on-line notary etc. e.g. US2006161781, signature verification (U.S. Pat. No. 6,381,344). WO0182036 discloses a system and method for signing, storing, and authenticating electronic documents using public key cryptography. The system comprises a document service computer cluster connected to user computers, document owner server computers, and registration computers via a network such as for example, the internet or the world wide web. WO0013368 discloses both the data object and the signature data are encrypted. None of these systems are designed or allow for distributed signing networks unlike the present invention.

U.S. Pat. No. 6,912,660 discloses a method for parallel approval of an electronic document. A document authentication code (DAC 0) is generated, linked to the original document. Subsequent approvals of the document generate a DAC x related to that specific approval. This is not linked to the present invention as it's a document approval system—i.e. one which allows a document to have multiple signatories to authenticate approval, the present invention does not do this at all.

U.S. Pat. No. 6,098,056 discloses a system and method for controlling access rights to and security of digital content in a distributed information system, e.g., Internet. The network includes at least one server coupled to a storage device for storing the limited access digital content encrypted using a random-generated key, known as a Document Encryption Key (DEK). The DEK is further encrypted with the server's public key, using a public/private key pair algorithm and placed in a digital container stored in a storage device and including as a part of the meta-information which is in the container. The client's workstation is coupled to the server (one of the many difference's from the present invention) for acquiring the limited access digital content under the authorized condition. A Trusted Information Handler (TIH) is validated by the server after the handler provides a data signature and type of signing algorithm to transaction data descriptive of the purchase agreement between the client and the owner. After the handler has authenticated, the server decrypts the encrypted DEK with its private key and re-encrypts the DEK with the handler's public key ensuring that only the information handler can process the information. The encrypted DEK is further encrypted with the client's public key personalizing the digital content to the client. The client's program decrypts the DEK with his private key and passes it along with the encrypted content to the handler which decrypts the DEK with his private key and proceeds to decrypt the content for displaying to the client.

U.S. Pat. No. 5,436,972 discloses a method for preventing inadvertent betrayal by a trustee of escrowed digital secrets. After unique identification data describing a user has been entered into a computer system, the user is asked to select a password to protect the system. U.S. Pat. No. 5,557,518 discloses a system to open electronic commerce using trusted agents. U.S. Pat. No. 5,557,765 discloses a system and method for data recovery. An encrypting user encrypts a method using a secret storage key (KS) and attaches a Data Recovery Field (DRF), including an Access Rule Index (ARI) and the KS to the encrypted message.

U.S. Pat. No. 5,590,199, discloses a system for authenticating and authorizing a user to access services on a heterogeneous computer network. The system includes at least one workstation and one authorization server connected to each other through a network.

US2006123227 and WO0221409 effort measuring techniques to validate signatures without the requirement for a central body or central messaging entity. This is an interesting new concept but not used in the current invention.

Attempts to moving towards attaining some limited aspects of self-encryption are demonstrated by:

(a) US2003053053625 discloses limitation of asymmetrical and symmetrical encryption algorithms, and particularly not requiring generation of a key stream from symmetric keys, nor requiring any time synchronizing, with minimal computational complexity and capable of operating at high speed. A serial data stream to be securely transmitted is first demultiplexed into a plurality N of encryptor input data stream. The input data slices are created which have a cascade of stages, include mapping & delay functions to generate output slices. These are transmitted though a transmission channel. Decryptor applies inverse step of cascade of stages, equalizing delay function and mapping to generate output data slices. The output data streams are multiplexed. The encryptor and decryptor require no synchronizing or timing and operate in simple stream fashion. N:N mapping does not require expensive arithmetic and implemented in table lookup. This provides robust security and efficiency. A significant difference between this approach and prior cipher method is that the session key is used to derive processing parameters (tables and delays) of the encryptor and decryptor in advance of data transmission. Instead of being used to generate a key stream at real-time rates. Algorithm for generating parameters from a session key is disclosed. This is a data communications network and not related to current invention.

(b) US2002184485 addresses secure communication, by encryption of message (SSDO-self signing document objects), such that only known recipient in possession of a secret key can read the message and verification of message, such that text and origin of message can be verified. Both capabilities are built into message that can be transmitted over internet and decrypted or verified by computer implementing a document representation language that supports dynamic content e.g. any standard web browser, such that elaborate procedures to ensure transmitting and receiving computers have same software are no longer necessary. Encrypted message or one encoded for verification can carry within itself all information needed to specify the algorithm needed for decryption.

US2004117303 discloses an anonymous payment system and is designed to enable users of the Internet and other networks to exchange cash for electronic currency that may be used to conduct commercial transactions worldwide through public networks. US2005289086 discloses an anonymity for web registration which allows payment system. US2002073318 describe use of servers where the system is effort based trust on combination of anonymous keys to transact and public key to buy non anonymous credits. Each of these is a centrally controlled system and do not provide a mechanism to transfer credits or cash to anonymous accounts. Many of these actually require user registration on a web site.

US2003163413 discloses a method of conducting anonymous transactions over the Internet to protect consumers from identity fraud. The process involves the formation of a Secure Anonymous Transaction Engine to enable any consumer operating over an open network, such as the Internet to browse, collect information, research, shop, and purchase anonymously. The Secure Anonymous Transaction Engine components provide a highly secure connection between the consumer and the provider of goods or services over the Internet by emulating an in store anonymous cash transaction although conducted over the Internet. This again is server based and requires user registration.

With regard to cash transfers, a truly anonymous purchase is one in which the purchaser and seller are unknown to each other, the purchase process is not witnessed by any other person, and the exchange medium is cash. Such transactions are not the norm. Even cash transactions in a place of business are typically witnessed by salespersons and other customers or bystanders, if not recorded on videotape as a routine security measure. On the other hand, common transaction media such as payment by personal check or credit card represent a clear loss of anonymity, since the purchaser's identity as well as other personal information is attached to the transaction (e.g., driver's license number, address, telephone number, and any information attached to the name, credit card, or driver's license number). Thus, although a cash transaction is not a truly anonymous purchase, it provides a considerably higher degree of purchase anonymity than a transaction involving a personal check or credit card, and affords perhaps the highest degree of purchase anonymity achievable in the present. The use of cash, however, has limitations, especially in the context of electronic commerce.

WO0203293 discloses methods, systems, and devices for performing transactions via a communications network such as the Internet while preserving the anonymity of at least one of the parties. A transaction device is linked to an anonymous account to allow a party to preserve an equivalent level of anonymity as the use of cash when making a transaction at a traditional brick-and-mortar business as well as in the virtual world of electronic commerce. As such, the transaction device may be considered equivalent to a flexible and versatile cash wallet. In this way, combines the desirable features of cash (anonymity, security, and acceptance) and of electronic commerce (speed, ease, and convenience). This like the next invention requires a hardware based device unlike the present invention.

EP0924667 is based on a distributed payment system for cash-free payment with purse chip cards using the Net. The system consists of a client system which is, for example, installed at the customer site and a server system which is, for example, installed at the dealer.

U.S. Pat. No. 6,299,062 discloses an electronic cash system for performing an electronic transaction using an electronic cash, comprises at least one user apparatus each capable of using the electronic cash; an authentication centre apparatus, for receiving a user identity information, a corresponding public key along with a certificate issue request from one of the user apparatus and for issuing a certificate for the user apparatus's public key after confirming the identity of the corresponding user. This again requires hardware and user registration to the system US2004172539 discloses method for generating an electronic receipt in a communication system providing a public key infrastructure, comprising the steps of receiving by a second party a request message from a first party, the request message comprising a transaction request and a first public key based on a secret owned by the first party and wherein the secret is associated with at least the secret of a further public key of the first party, (server based)

WO0219075 discloses publicly-accessible, independent, and secure host internet site that provides a downloadable agent program to any anonymous client PC, with the agent program generating within the client PC a registration checksum based upon the document to be registered.

US2003159032 discloses automatically generating unique, one-way compact and mnemonic voter credentials that support privacy and security services. Discloses any voting system, voting organization, or voting game wherein participants need to be anonymous and/or must exchange secrets and/or make collective decisions. US2002077887 (requires registration and initial knowledge of the person who receives the ballot, and requires a server) discloses an architecture that enables anonymous electronic voting over the Internet using public key technologies. Using a separate public key/private key pair, the voting mediator validates the voting ballot request. (Hardware device) DE10325491 discloses that the voting method has an electronic ballot box for collecting encoded electronic voting slips and an electronic box for collecting the decoded voting slips. The voter fills out his voting slip at a computer and authenticates his vote with an anonymous signature setting unit.

US2004024635 (hardware based, requiring servers) discloses a distributed network voting system; a server for processing votes cast over a distributed computing network. The server includes memory storage, data identification, an interested party and a processor in communication with the memory. The processor operates to present an issue to a user of a client computer, receive a vote on the issue from the user, and transmit data relating to the vote to the interested party based upon the data identifying the interested party stored in the memory. The processor further operates to generate a vote status cookie when the user submits the vote, transmit the vote status cookie to the client for storage, and transmit data to the user that prompts the user to provide authentication data relating to the user, who then receives authentication data relating to the user and authenticate the user based on the authentication data.

WO03098172 discloses modular monitoring and protection system with distributed voting logic.

US2006112243 discloses a hard disk mapping where the data is copied locally and then the machine decides it can use either copy and whether or not update the other one. EP1049291 discloses a remote device monitoring using pre-calculated maps of equipment locations. These are hardware based data mapping systems and not related. As above prior art highlights separate existence of elements such as storage, security, repairing, encryption, authentication, anonymity, voting and mapping etc. for data transaction and storage via internet. There is some limited linkage between a few of the individual elements but none are inter-linked to provide comprehensive solution for secure data storage and transmittance via internet utilisation. The inventions below list solutions to address the vacuum and provide an inexpensive solution for secure internet data storage and transmittance with other added benefits.

SUMMARY OF THE INVENTION

The main embodiments of this invention are as follows:
A system of sharing access to private files which has the functional elements of:
 1. Perpetual Data
 2. Self encryption
 3. Data Maps
 4. Anonymous Authentication
 5. Shared access to Private files
 6. ms Messenger
 7. Cyber Cash
 8. Worldwide Voting System
with the additionally linked functional elements of:
 1. Peer Ranking
 2. Self Healing
 3. Security Availability
 4. Storage and Retrieval
 5. Duplicate Removal
 6. Storing Files 577-Tr-Chunking-
 7. Encryption/Decryption
 8. Identify Chunks
 9. Revision Control
 10. Identify Data with Very Small File
 11. Logon
 12. Provide Key Pairs
 13. Validation
 14. Create Map of Maps
 15. Share Map
 16. Provide Public ID
 17. Encrypted Communications
 18. Document Signing
 19. Contract Conversations
 20. Counterfeit Protection
 21. Allow Selling of Machine Resources
 22. Interface with Non-Anonymous Systems
 23. Anonymous Transactions
 24. Anonymity
 25. Proven Individual
 26. Validation of Vote Being Used
 27. Distributed Controlled Voting A distributed network system and product which provides:
a. secure communications
b. store data & share resources
c. anonymous backing and restoring data d. share private files & secure data without using server e. anonymous authentication of users f. approve transaction based on digital currency g. CPU sharing via anonymous voting system A method allowing users to securely store data and share resources across a distributed network by utilising anonymously shared computer resources.

A method to allow secure communications between users by utilizing public ID's linked to anonymous ID'S to authenticate users as well as allowing contract signed conversations.

A method to allow sharing and allocation of resources globally by utilising effort based testing and anonymously authenticated users in a global distributed network.

A method specifically to backup and restore data anonymously in a distributed network with guarantees on integrity and recovery times.

A method to share private and secured data without the use of file servers or any controlling body or centralised resource.

A method to approve the exchange of resources and other transactions based on a digital currency which utilises links with non anonymous payment systems.

A method to allow data to be described decoded and identified using very small data map files.

A method to allow anonymous authentication of users on a network.

A method of above to allow sharing of CPU power globally and to contribute to systems based on users input from a worldwide secure and anonymous voting system.

A method where a person's computer operating system and related computer program may be held on a removable disk (such as a USB stick optionally with biometric recognition to evade key loggers) and used to boot any compatible computer with a known virus/trojan horse free system to access their data remotely and securely without worrying about the integrity of host machine they are using.

At least one computer program comprising instructions for causing at least one computer to perform the method, system and product according to any of above. That at least one computer program of above embodied on a recording medium or read-only memory, store.

BRIEF DESCRIPTION OF THE SEVERAL VIEWS OF THE DRAWINGS

Embodiments of the present invention will now be described, by way of example only, with reference to the accompanying drawings in which:

FIG. 1b is a diagram of perpetual data elements of the system of FIG. 1a;

FIG. 1c is a diagram of self encryption elements of the system of FIG. 1a;

FIG. 1d is a diagram of datamap elements of the system of FIG. 1a;

FIG. 1e is a diagram of anonymous authentication elements of the system of FIG. 1a;

FIG. 1f is a diagram of shared access elements of the system of FIG. 1a;

FIG. 1g is a diagram of messenger elements of the system of FIG. 1a;

FIG. 1h is a diagram of cyber cash elements of the system of FIG. 1a;

FIG. 1i is a diagram of voting system elements of the system of FIG. 1a;

FIG. 2 is a flow chart of the self authentication process for the system of FIG. 1a;

FIG. 3 is a diagram of peer to peer interaction for the system of FIG. 1a;

FIG. 4 is a flow chart of the authentication process for the system of FIG. 1a;

FIG. 5 is a flow chart of the data assurance event for the system of FIG. 1a;

FIG. 6 is a flow chart of the chunking event for the system of FIG. 1a;

FIG. 7 is an example of chunking performed by the system of FIG. 1a;

FIG. 8 is a flow chart of the self healing event for the system of FIG. 1a;

FIG. 9 is a flow chart of the peer ranking event for the system of FIG. 1a;

FIG. 10 is a flow chart of the duplicate removal event for the system of FIG. 1a;

FIG. 11 is a flow chart for storing perpetual data performed by the system of FIG. 1a;

FIG. 12 is a diagram of a chunk checking process performed by the system of FIG. 1a;

FIG. 13 is a flow chart of the storage of additional chunks for the system of FIG. 1a;

FIG. 14 is a flow chart of the self healing process for the system of FIG. 1a;

FIG. 15 is a flow chart of saving data for the system of FIG. 1a;

FIG. 16 is a flow chart of deleting data for the system of FIG. 1a;

FIG. 17 is a flow chart of a self encryption process of the system of FIG. 1a;

FIG. 18 is a flow chart of a shared access process of the system of FIG. 1a;

FIG. 19 is a flow chart of a messenger application for the system of FIG. 1a; and FIG. 20 is a flow chart of a voting application for the system of FIG. 1a.

Figure 1A:
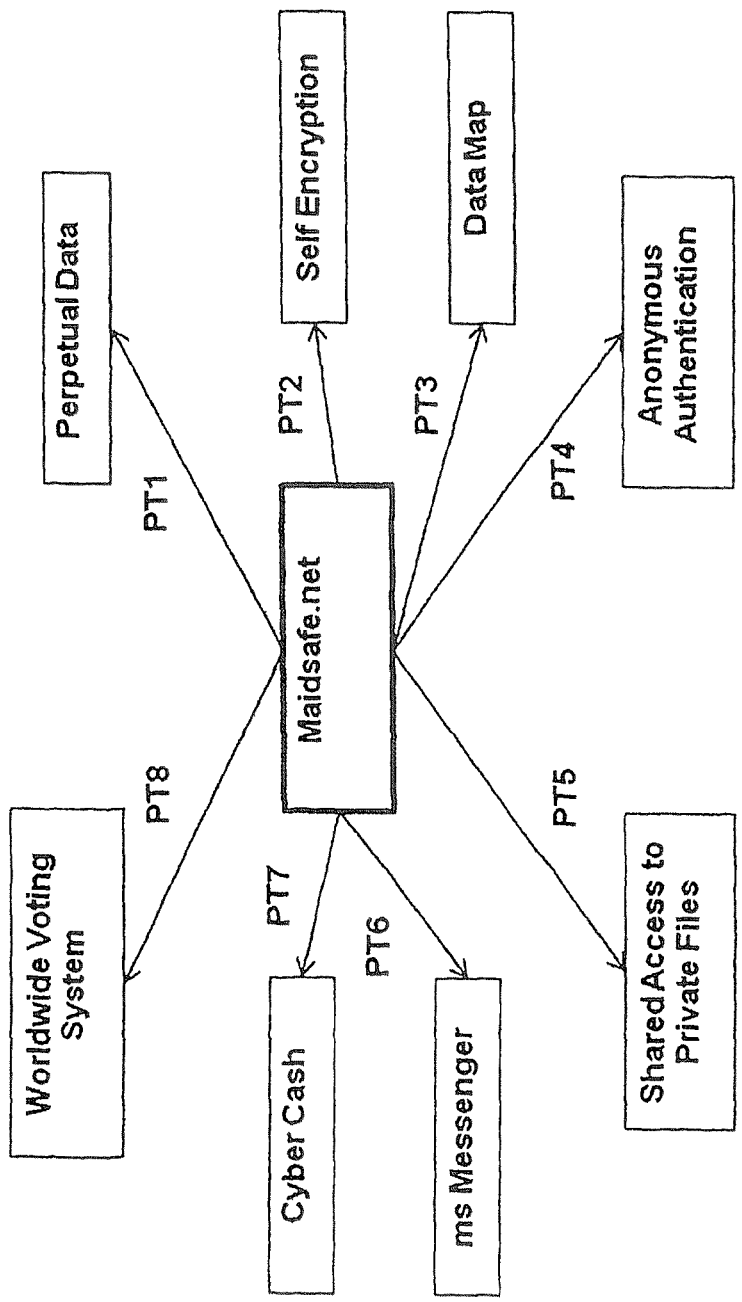
FIG. 1a is a system diagram according to the invention.
Figure 1B:
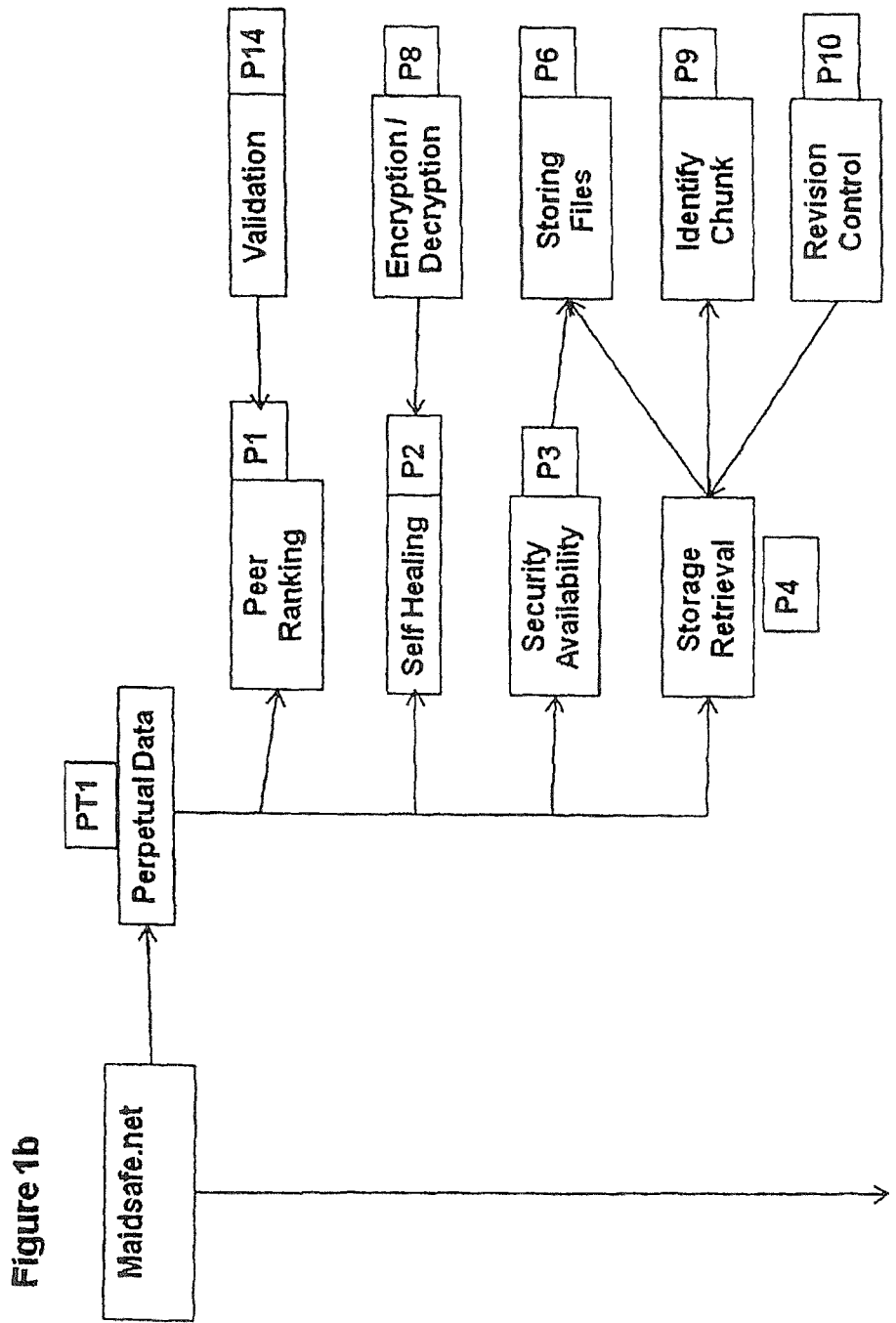
Figure 1C:
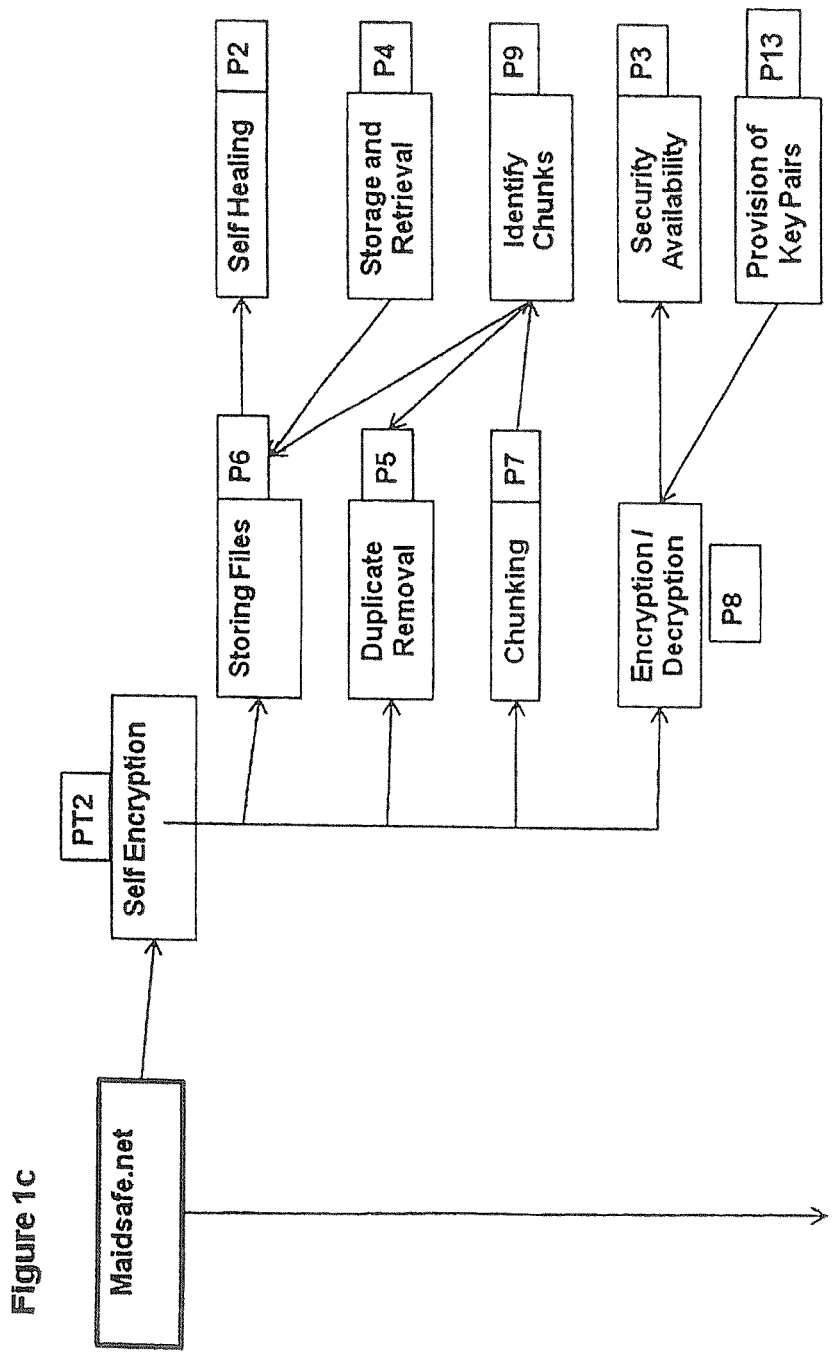
Figure 1D:
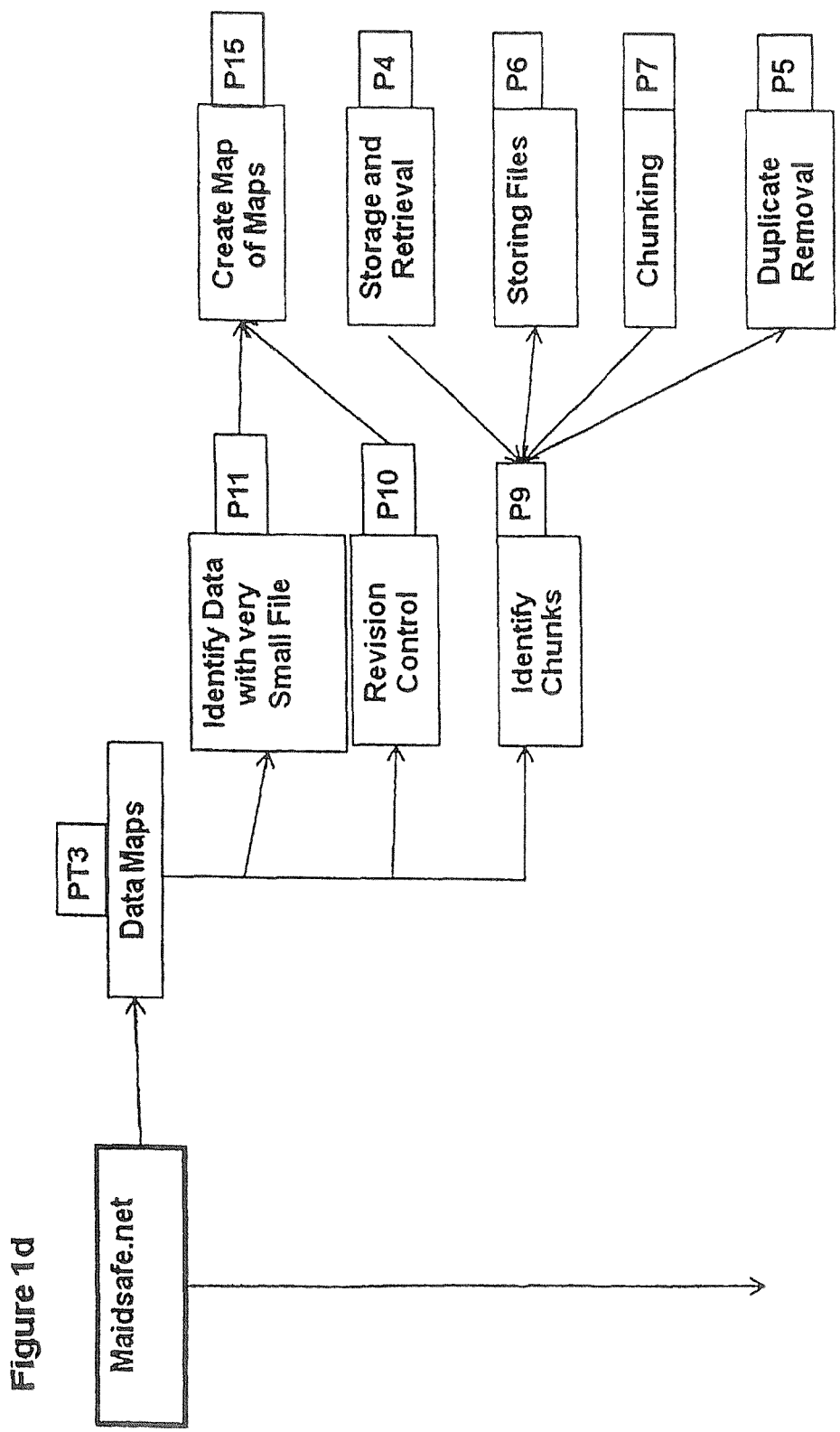
Figure 1E:
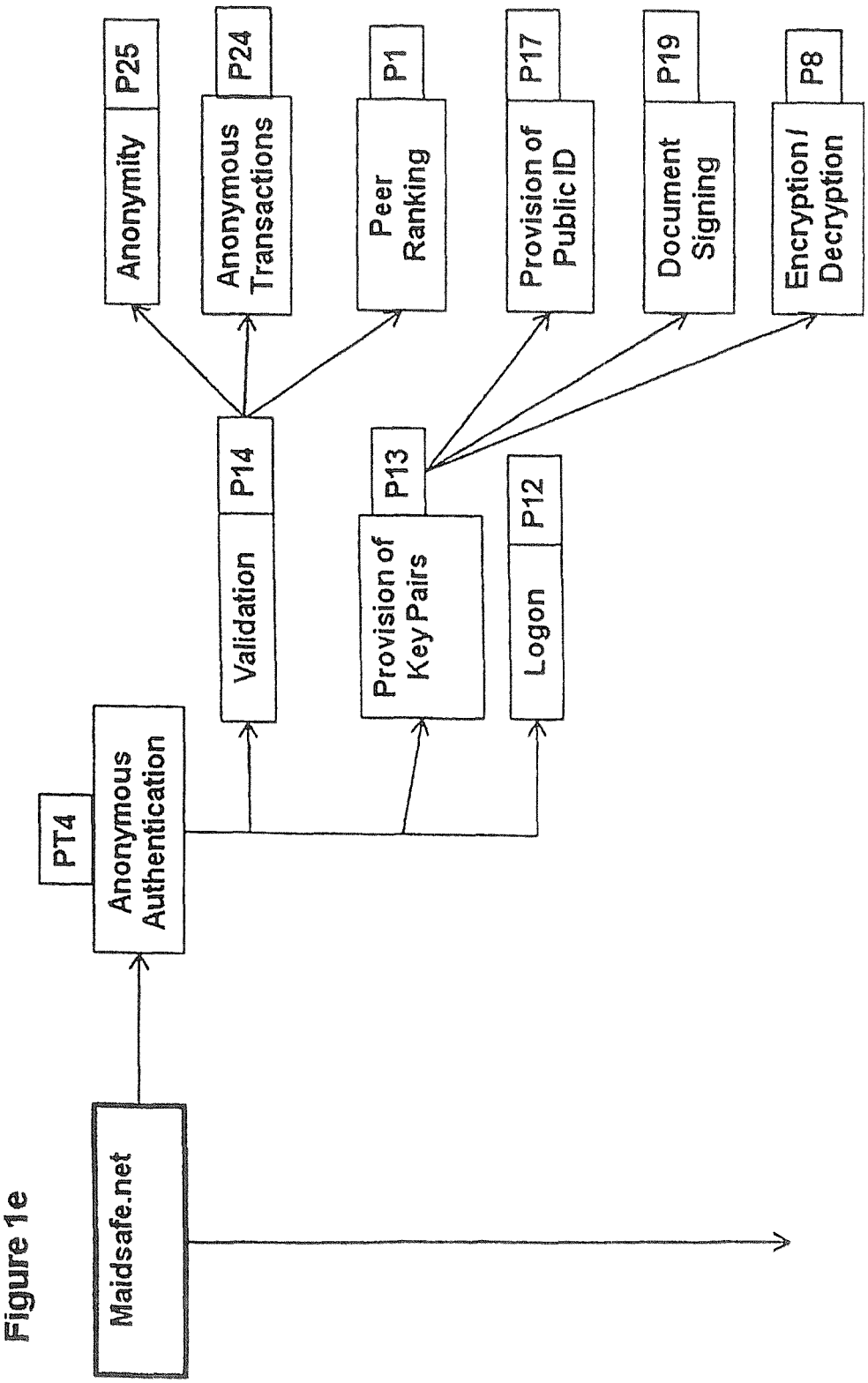
Figure 1F:
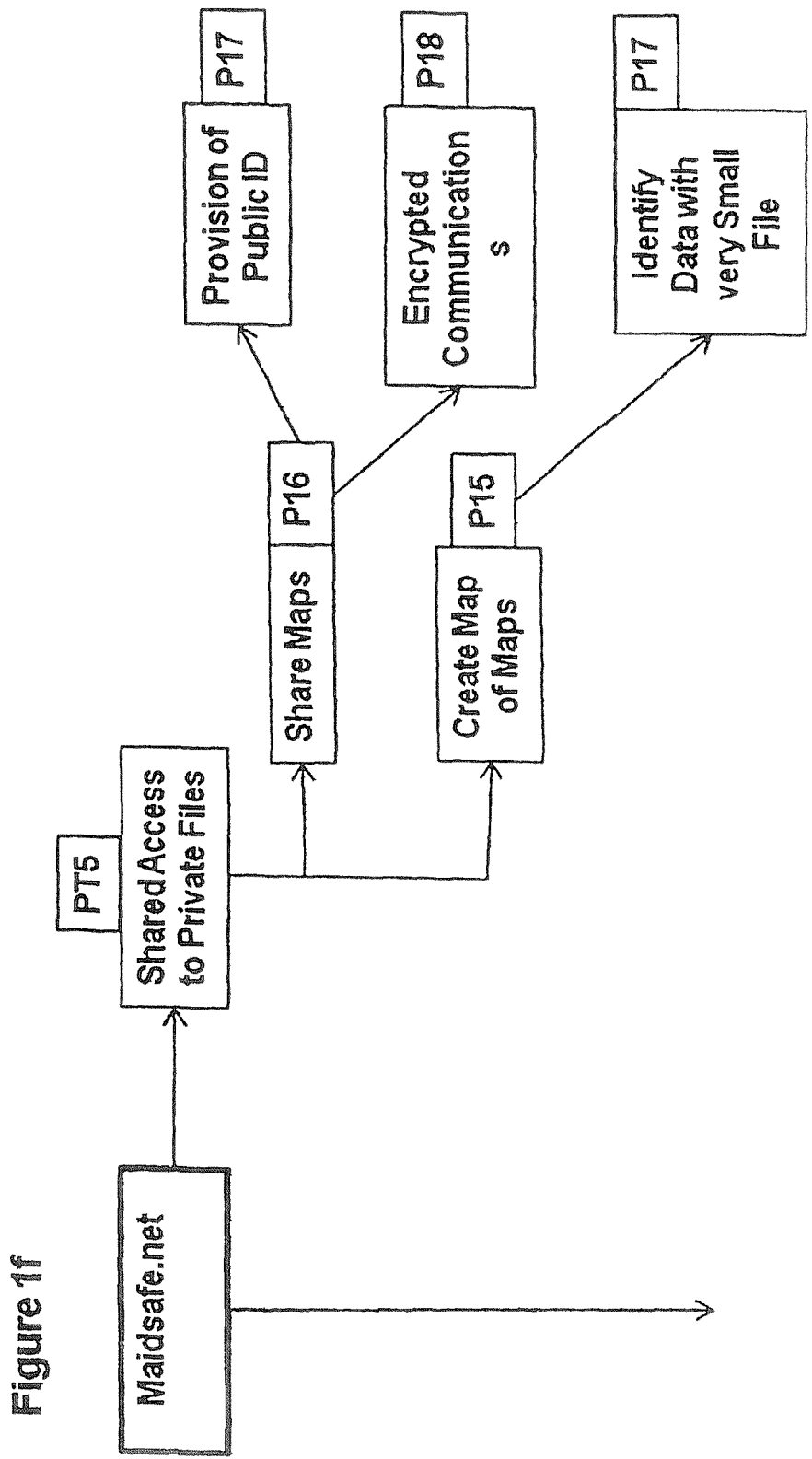
Figure 1G:
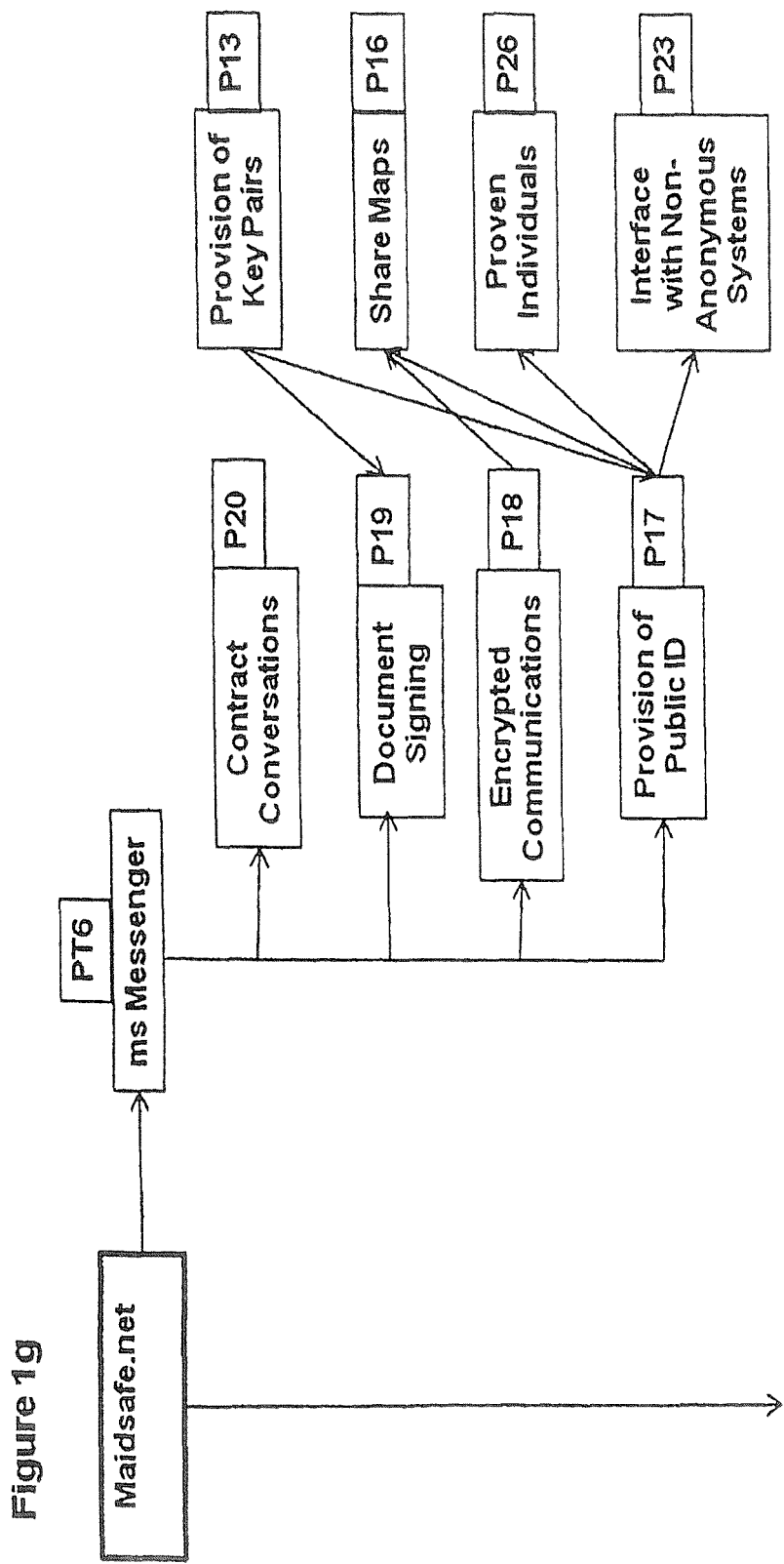
Figure 1H:
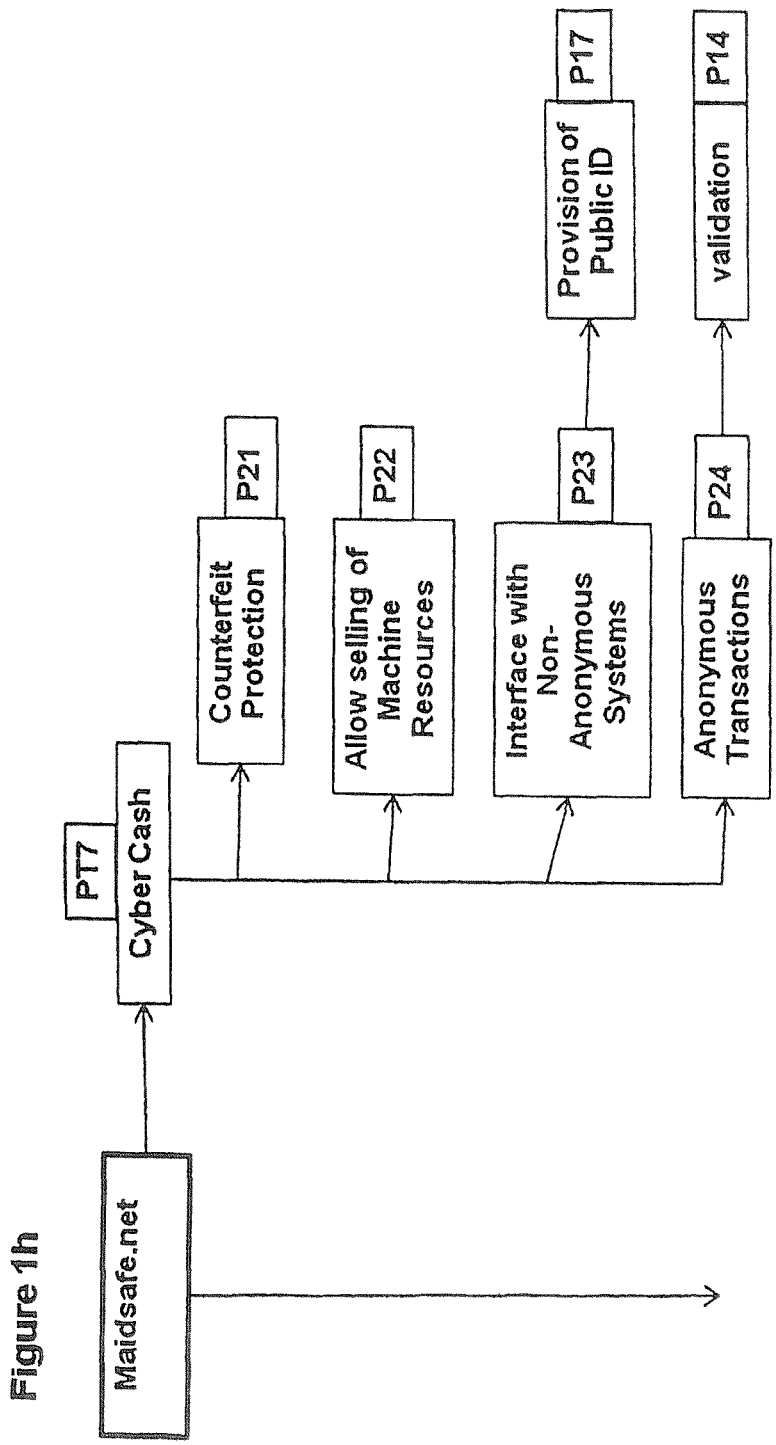

DETAILED DESCRIPTION (References to IDs Used in Descriptions of the System's Functionality)

MID—this is the base ID and is mainly used to store and forget files. Each of these operations will require a signed request. Restoring may simply require a request with an ID attached.

PMID—This is the proxy mid which is used to manage the receiving of instructions to the node from any network node such as get/put/forget etc. This is a key pair which is stored on the node—if stolen the key pair can be regenerated simply disabling the thiefs stolen PMID—although there's not much can be done with a PMID key pair.

CID—Chunk Identifier, this is simply the chunkid.KID message on the net.

TMID—This is today's ID a one time ID as opposed to a one time password. This is to further disguise users and also ensure that their MID stays as secret as possible.

MPID—The maidsafe.net public ID. This is the ID to which users their own name and actual data if required. This is the ID for messenger, sharing, non anonymous voting and any other method that requires we know the user.

MAID—this is basically the hash of and actual public key of the MID. this ID is used to identify the user actions such as put/forget/get on the maidsafe.net network. This allows a distributed PKI infrastructure to exist and be automatically checked.

KID—Kademlia ID this can be randomly generated or derived from known and preferably anonymous information such as an anonymous public key hash as with the MAID. In this case we use kademlia as the example overlay network although this can be almost any network environment at all.

MSID—maidsafe.net Share ID, an ID and key pair specifically created for each share to allow users to interact with shares using a unique key not related to their MID which should always be anonymous and separate.

Anonymous authentication relates to system authentication and, in particular, authentication of users for accessing resources stored on a distributed or peer-to-peer file system. Its aim is to preserve the anonymity of the users and to provide secure and private storage of data and shared resources for users on a distributed system. It is a method of authenticating access to a distributed system comprising the steps of;

Receiving a user identifier;
Retrieving an encrypted validation record identified by the user identifier;
Decrypting the encrypted validation record so as to provide decrypted information; and . . . .
Authenticating access to data in the distributed system using the decrypted information.

Receiving, retrieving and authenticating may be performed on a node in the distributed system preferably separate from a node performing the step of decrypting. The method further comprises the step of generating the user identifier using a hash. Therefore, the user identifier may be considered unique (and altered if a collision occurs) and suitable for identifying unique validation records. The step of authenticating access may preferably further comprise the step of digitally signing the user identifier. This provides authentication that can be validated against trusted authorities. The method further comprises the step of using the signed user identifier as a session passport to authenticate a plurality of accesses to the distributed system. This allows persistence of the authentication for an extended session.

The step of decrypting preferably comprises decrypting an address in the distributed system of a first chunk of data and the step of authenticating access further comprises the step of determining the existence of the first chunk at the address, or providing the location and names of specific data elements in the network in the form of a data map as previously describe. This efficiently combines the tasks of authentication and starting to retrieve the data from the system. The method preferably further comprises the step of using the content of the first chunk to obtain further chunks from the distributed system. Additionally the decrypted data from the additional chunks may contain a key pair allowing the user at that stage to sign a packet sent to the network to validate them or additionally may preferable self sign their own id.

Therefore, there is no need to have a potentially vulnerable record of the file structure persisting in one place on the distributed system, as the user's node constructs its database of file locations after logging onto the system.

There is provided a distributed system comprising;
a storage module adapted to store an encrypted validation record;
a client node comprising a decryption module adapted to decrypt an encrypted validation record so as to provide decrypted information; and
a verifying node comprising:
a receiving module adapted to receive a user identifier;
a retrieving module adapted to retrieve from the storage module an encrypted validation record identified by the user identifier;
a transmitting module adapted to transmit the encrypted validation record to the client node; and
an authentication module adapted to authenticate access to data in the distributed file system using the decrypted information from the client node.

The client node is further adapted to generate the user identifier using a hash. The authentication module is further adapted to authenticate access by digitally sign the user identifier. The signed user identifier is used as a session passport to authenticate a plurality of accesses by the client node to the distributed system. The decryption module is further adapted to decrypt an address in the distributed system of a first chunk of data from the validation record and the authentication module is further adapted to authenticate access by determining the existence of the first chunk at the address. The client node is further adapted to use the content of the first chunk to obtain further authentication chunks from the distributed system.

There is provided at least one computer program comprising program instructions for causing at least one computer to perform. One computer program is embodied on a recording medium or read-only memory, stored in at least one computer memory, or carried on an electrical carrier signal.

Additionally there is a check on the system to ensure the user is login into a valid node (software package). This will preferably include the ability of the system to check validity of the running maidsafe.net software by running content hashing or preferably certificate checking of the node and also the code itself.

Linked Elements for maidsafe.net (FIG. 1)

The maidsafe.net product invention consists of 8 individual inventions, which collectively have 28 inter-linked functional elements, these are:

The individual inventions are:
PT1—Perpetual Data
PT2—Self encryption
PT3—Data Maps
PT4—Anonymous Authentication
PT5—Shared access to Private files
PT6—ms Messenger
PT7—Cyber Cash
PT8—Worldwide Voting System The inter-linked functional elements are:
P1—Peer Ranking
P2—Self Healing
P3—Security Availability
P4—Storage and Retrieval
P5—Duplicate Removal
P6—Storing Files
P7—Chunking
P8—Encryption/Decryption
P9—Identify Chunks
P10—Revision Control
P11—Identify Data with Very Small File
P12—Logon
P13—Provide Key Pairs
P14—Validation
P15—Create Map of Maps
P16—Share Map
P17—Provide Public ID
P18—Encrypted Communications
P19—Document Signing
P21—Counterfeit Prevention
P22—Allow Selling of Machine Resources
P23—Interface with Non-Anonymous Systems
P24—Anonymous Transactions
P25—Anonymity
P26—Proven Individual
P27—Validation of Vote Being Used
P28—Distributed Controlled Voting
(Description of FIG. 1 Here * * * )

Figure 2:
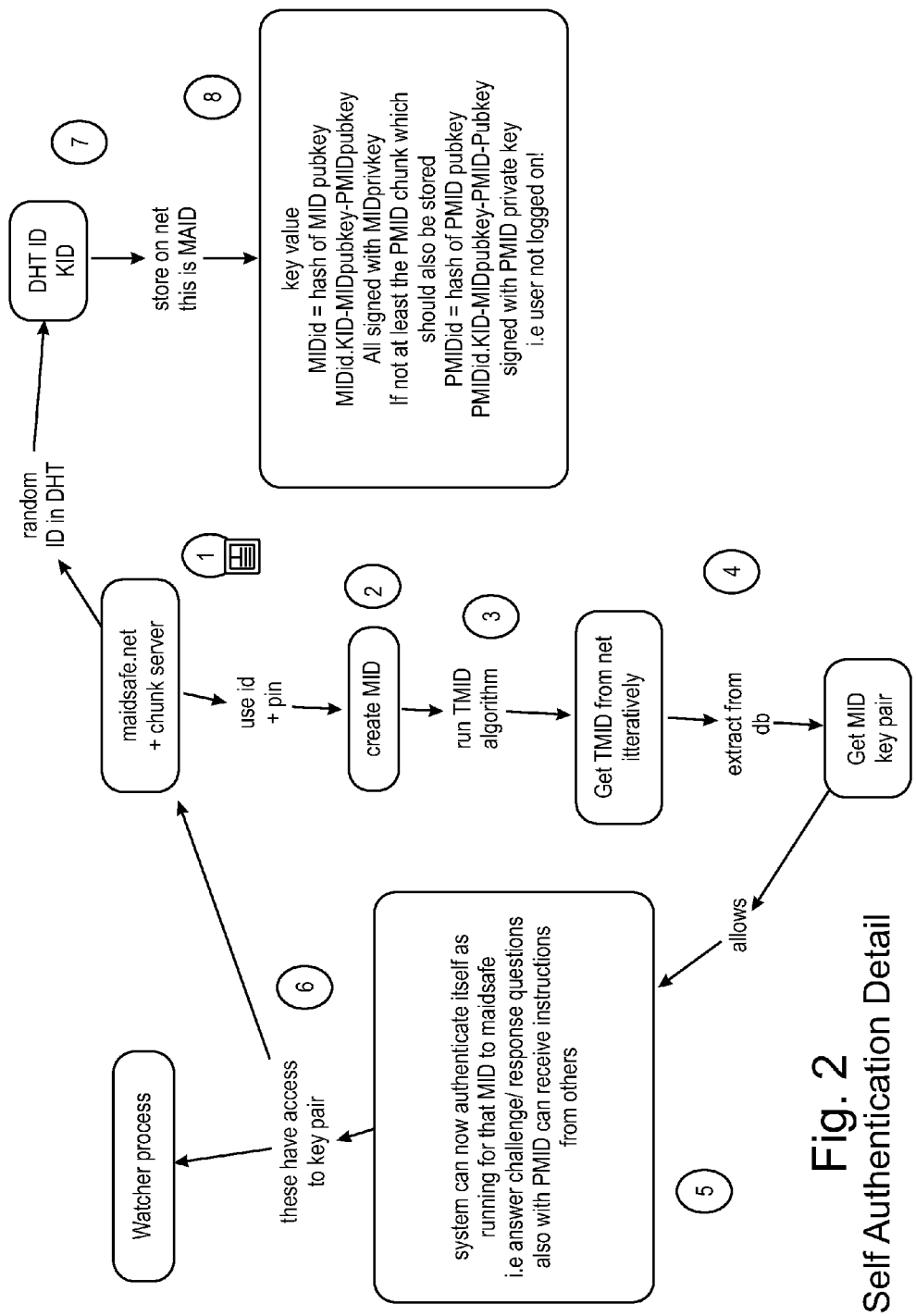

Self Authentication Detail (FIG. 2)

1. A computer program consisting of a user interface and a chunk server (a system to process anonymous chunks of data) should be running, if not they are started when user selects an icon or other means of starting the program.

2. A user will input some data known to them such as a user id (random ID) and PIN number in this case. These pieces of information may be concatenated together and hashed to create a unique (which may be confirmed via a search) identifier. In this case this is called the MID (maidsafe.net ID)

3. A TMID (Today's MID) is retrieved from the network, the TMID is then calculated as follows:

The TMID is a single use or single day ID that is constantly changed. This allows maidsafe.net to calculate the hash based on the user ID pin and another known variable which is calculable. For this variable we use a day variable for now and this is the number of days since epoch (Jan. 1, 1970). This allows for a new ID daily, which assists in maintaining the anonymity of the user. This TMID will create a temporary key pair to sign the database chunks and accept a challenge response from the holder of these db chunks. After retrieval and generation of a new key pair the db is put again in new locations—rendering everything that was contained in the TMID chunk useless. The TMID CANNOT be signed by anyone (therefore hackers can't BAN an unsigned user from retrieving this—in a DOS attack)—it is a special chunk where the data hash does NOT match the name of the chunk (as the name is a random number calculated by hashing other information (i.e. its a hash of the TMID as described below)

take dave as user ID and 1267 as pin.
    dave+(pin) 1267=dave1267 Hash of this becomes MID
    day variable (say today is 13416 since epoch)=13416
    so take pin, and for example add the number in where the pin states i.e.
    613dav41e1267
    (6 at beginning is going around pin again)
    so this is done by taking 1st pin 1—so put first day value at position 1
    then next pin number 2—so day value 2 at position 2
    then next pin number 6 so day value 3 at position 6
    then next pin number 7 so day value 4 at position 7
    then next pin number is 1 so day value 5 at position 1 (again)
    so TMID is hash of 613dav41e1267 and the MID is simply a hash of dave 1267 (This is an example algorithm and many more can be used to enforce further security.)

4. From the TMID chunk the map of the user's database (or list of files maps) is identified. The database is recovered from the net which includes the data maps for the user and any keys passwords etc. The database chunks are stored in another location immediately and the old chunks forgotten. This can be done now as the MID key pair is also in the database and can now be used to manipulate user's data.

5. The maidsafe.net application can now authenticate itself as acting for this MID and put get or forget data chunks belonging to the user.

6. The watcher process and Chunk server always have access to the PMID key pair as they are stored on the machine itself, so can start and receive and authenticate anonymous put/get/forget commands.

7. A DHT ID is required for a node in a DHT network this may be randomly generated or in fact we can use the hash of the PMID public key to identify the node.

8. When the users successfully logged in he can check his authentication validation records exist on the network. These may be as follows:

MAID (maidsafe.net anonymous ID)

1. This is a data element stored on net and preferably named with the hash of the MID public Key.

2. It contains the MID public key+any PMID public keys associated with this user.

3. This is digitally signed with the MID private key to prevent forgery.

4. Using this mechanism this allows validation of MID signatures by allowing any users access to this data element and checking the signature of it against any challenge response from any node pertaining to be this MID (as only the MID owner has the private key that signs this MID) Any crook could not create the private key to match to the public key to digitally sign so forgery is made impossible given today's computer resources.

5. This mechanism also allows a user to add or remove PMIDS (or chunk servers acting on their behalf like a proxy) at will and replace PMID's at any time in case of the PMID machine becoming compromised. Therefore this can be seen as the PMID authentication element.

PMID (Proxy MID)

1. This is a data element stored on the network and preferably named with the hash of the PMID public key.

2. It contains the PMID public key and the MID ID (i.e. the hash of the MID public key) and is signed by the MID private key (authenticated).

3. This allows a machine to act as a repository for anonymous chunks and supply resources to the net for a MID.

4. When answering challenge responses any other machine will confirm the PMID by seeking and checking the MIAD for the PMID and making sure the PMID is mentioned in the MAID bit—otherwise the PMID is considered rouge.

5. The key pair is stored on the machine itself and may be encoded or encrypted against a password that has to be entered upon start-up (optionally) in the case of a proxy provider who wishes to further enhance PMID security.

6. The design allows for recovery from attack and theft of the PMID key pair as the MAID data element can simply remove the PMID ID from the MAID rendering it unauthenticated.

Figure 3:
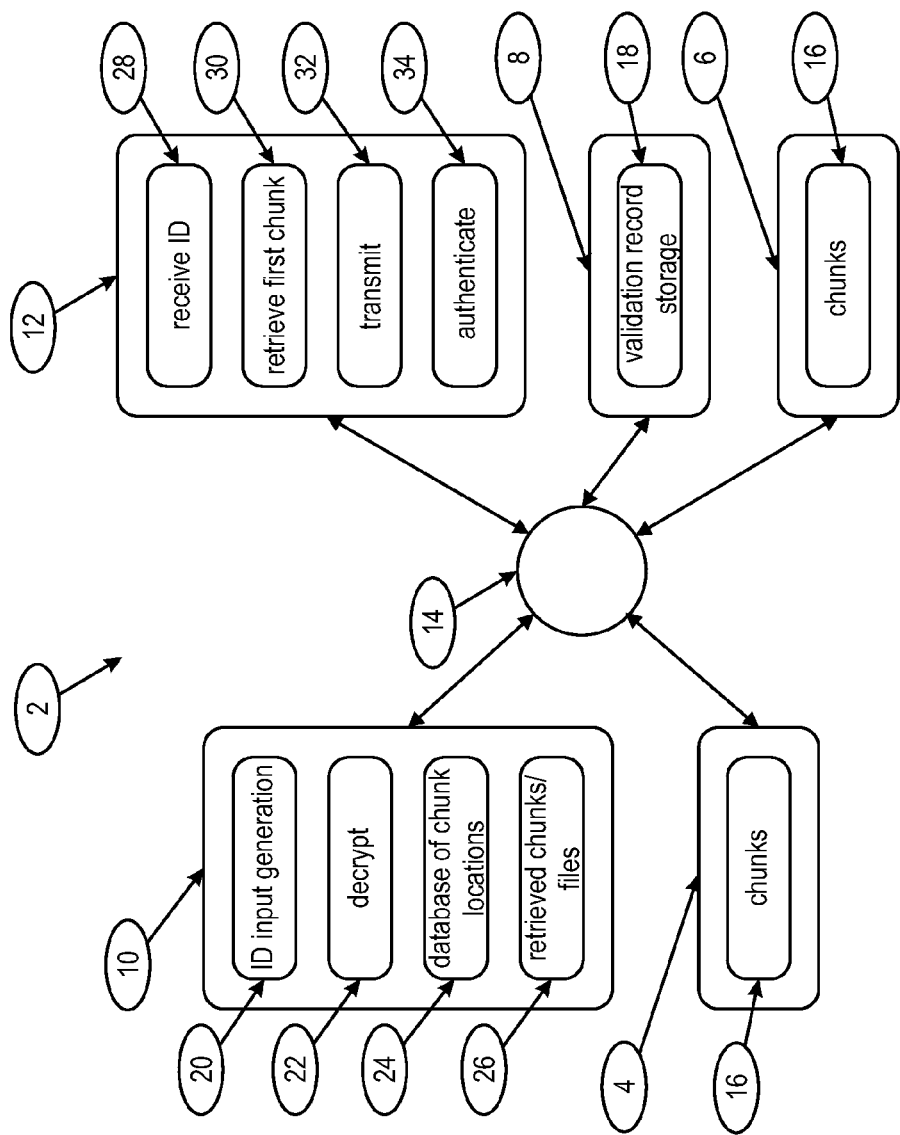
Figure 4:
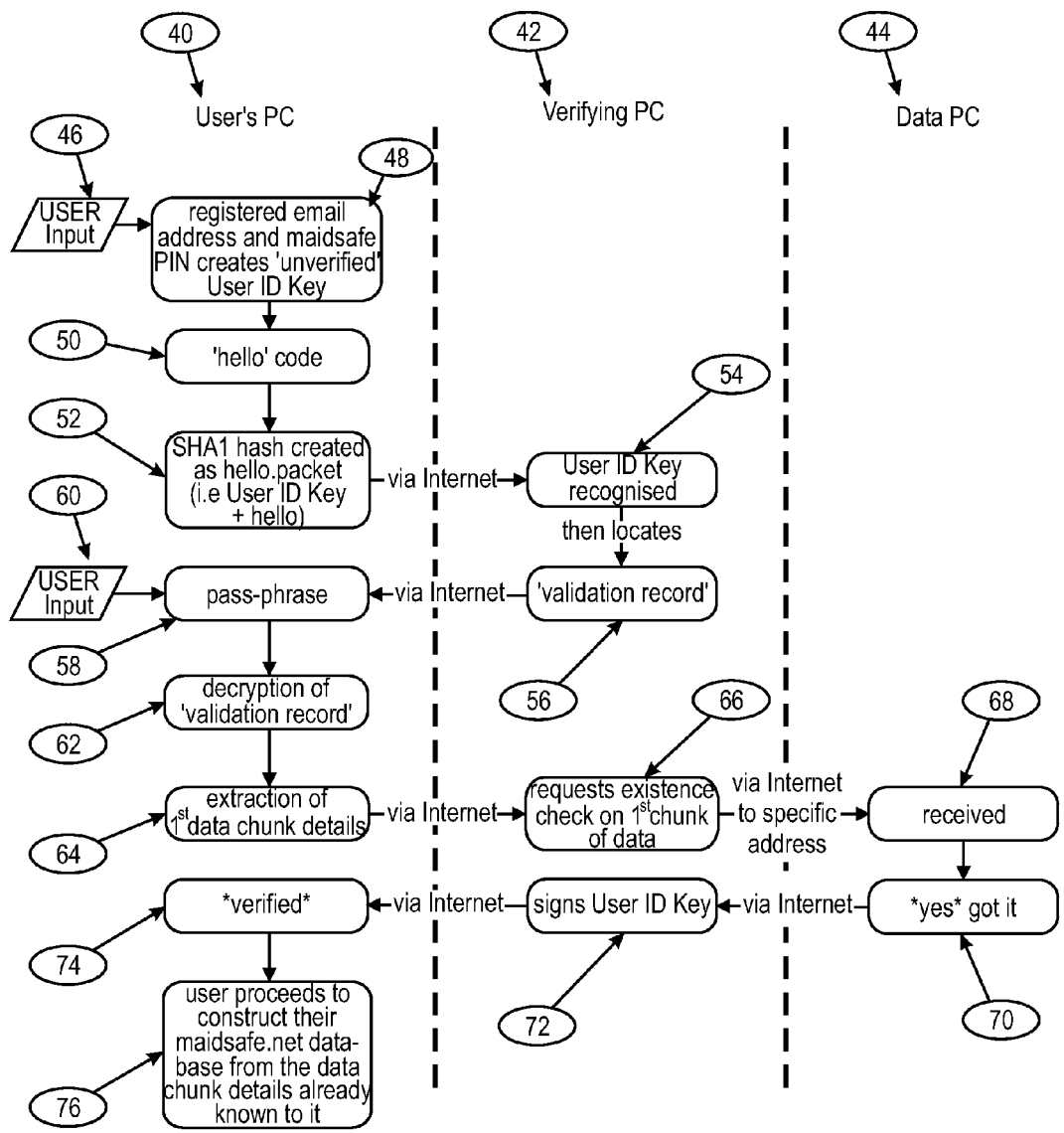

FIG. 3 illustrates, in schematic form, a peer-to-peer network in accordance with an embodiment of the invention; and FIG. 4 illustrates a flow chart of the authentication, in accordance with a preferred embodiment of the present invention.

With reference to FIG. 3, a peer-to-peer network 2 is shown with nodes 4 to 12 connected by a communication network 14. The nodes may be Personal Computers (PCs) or any other device that can perform the processing, communication and/or storage operations required to operate the invention. The file system will typically have many more nodes of all types than shown in FIG. 3 and a PC may act as one or many types of node described herein. Data nodes 4 and 6 store chunks 16 of files in the distributed system. The validation record node 8 has a storage module 18 for storing encrypted validation records identified by a user identifier.

The client node 10 has a module 20 for input and generation of user identifiers. It also has a decryption module 22 for decrypting an encrypted validation record so as to provide decrypted information, a database or data map of chunk locations 24 and storage 26 for retrieved chunks and files assembled from the retrieved chunks.

The verifying node 12 has a receiving module 28 for receiving a user identifier from the client node. The retrieving module 30 is configured to retrieve from the data node an encrypted validation record identified by the user identifier. Alternatively, in the preferred embodiment, the validation record node 8 is the same node as the verifying node 12, i.e. the storage module 18 is part of the verifying node 12 (not as shown in FIG. 3). The transmitting module 32 sends the encrypted validation record to the client node. The authentication module 34 authenticates access to chunks of data distributed across the data nodes using the decrypted information.

With reference to FIG. 4, a more detailed flow of the operation of the present invention is shown laid out on the diagram with the steps being performed at the User's PC (client node) on the left 40, those of the verifying PC (node) in the centre 42 and those of the data PC (node) on the right 44.

A login box is presented 46 that requires the user's name or other detail, Preferably email address (the same one used in the client node software installation and registration process) or simply name (i.e. nickname) and the user's unique number, preferably PIN number. If the user is a 'main user' then some details may already be stored on the PC. If the user is a visitor, then the login box appears.

A content hashed number such as SHA (Secure Hash Algorithm), Preferably 160 bits in length, is created 48 from these two items of data. This 'hash' is now known as the 'User ID Key' (MID), which at this point is classed as 'unverified' within the system. This is stored on the network as the MAID and is simply the hash of the public key containing an unencrypted version of the public key for later validation by any other node. This obviates the requirement for a validation authority The software on the user's PC then combines this MID with a standard 'hello' code element 50, to create 52 a 'hello. packet'. This hello.packet is then transmitted with a timed validity on the Internet.

The hello.packet will be picked up by the first node (for this description, now called the 'verifying node') that recognises 54 the User ID Key element of the hello.packet as matching a stored, encrypted validation record file 56 that it has in its storage area. A login attempt monitoring system ensures a maximum of three responses. Upon to many attempts, the verifying PC creates a 'black list' for transmission to peers. Optionally, an alert is returned to the user if a 'black list' entry is found and the user may be asked to proceed or perform a virus check.

The verifying node then returns this encrypted validation record file to the user via the internet. The user's pass phrase 58 is requested by a dialog box 60, which will then allow decryption of this validation record file.

When the validation record file is decrypted 62, the first data chunk details, including a 'decrypted address', are extracted 64 and the user PC sends back a request 66 to the verifying node for it to initiate a query for the first 'file-chunk ID' at the 'decrypted address' that it has extracted from the decrypted validation record file, or preferably the data map of the database chunks to recreate the database and provide access to the key pair associated with this MID.

The verifying node then acts as a 'relay node' and initiates a 'notify only' query for this 'file-chunk ID' at the 'decrypted address'.

Given that some other node (for this embodiment, called the 'data node') has recognised 68 this request and has sent back a valid 'notification only' message 70 that a 'file-chunk ID' corresponding to the request sent by the verifying node does indeed exist, the verifying node then digitally signs 72 the initial User ID Key, which is then sent back to the user. On reception by the user 74, this verified User ID Key is used as the user's session passport. The user's PC proceeds to construct 76 the database of the file system as backed up by the user onto the network. This database describes the location of all chunks that make up the user's file system. Preferably the ID Key will contain irrefutable evidence such as a public/private key pair to allow signing onto the network as authorised users, preferably this is a case of self signing his or her own ID—in which case the ID Key is decrypted and user is valid—self validating.

Further details of the embodiment will now be described. A 'proxy-controlled' handshake routine is employed through an encrypted point-to-point channel, to ensure only authorised access by the legal owner to the system, then to the user's file storage database, then to the files therein. The handshaking check is initiated from the PC that a user logs on to (the 'User PC), by generating the 'unverified encrypted hash' known as the 'User ID Key', this preferably being created from the user's information preferably email address and their PIN number. This 'hash' is transmitted as a 'hello. packet' on the Internet, to be picked up by any system that recognises the User ID as being associated with specific data that it holds. This PC then becomes the 'verifying PC and will initially act as the User PC's 'gateway' into the system during the authentication process. The encrypted item of data held by the verifying PC will temporarily be used as a 'validation record', it being directly associated with the user's identity and holding the specific address of a number of data chunks belonging to the user and which are located elsewhere in the peer-to-peer distributed file system. This 'validation record' is returned to the User PC for decryption, with the expectation that only the legal user can supply the specific information that will allow its accurate decryption. Preferably this data may be a signed response being given back to the validating node which is possible as the id chunk when decrypted (preferably symmetrically) contains the users public and private keys allowing non refutable signing of data packets.

Preferably after successful decryption of the TMID packet (as described above) the machine will now have access to the data map of the database and public/private key pair allowing unfettered access to the system.

It should be noted that in this embodiment, preferably no communication is carried out via any nodes without an encrypted channel such as TLS (Transport Layer Security) or SSL (Secure Sockets Layer) being set up first. A peer talks to another peer via an encrypted channel and the other peer (proxy) requests the information (e.g. for some space to save information on or for the retrieval of a file). An encrypted link is formed between all peers at each end of communications and also through the proxy during the authentication process. This effectively bans snoopers from detecting who is talking to whom and also what is being sent or retrieved. The initial handshake for self authentication is also over an encrypted link.

Secure connection is provided via certificate passing nodes, in a manner that does not require intervention, with each node being validated by another, where any invalid event or data, for whatever reason (fraud detection, snooping from node or any invalid algorithms that catch the node) will invalidate the chain created by the node. This is all transparent to the user.

Further modifications and improvements may be added without departing from the scope of the invention herein described.

Figure 5:
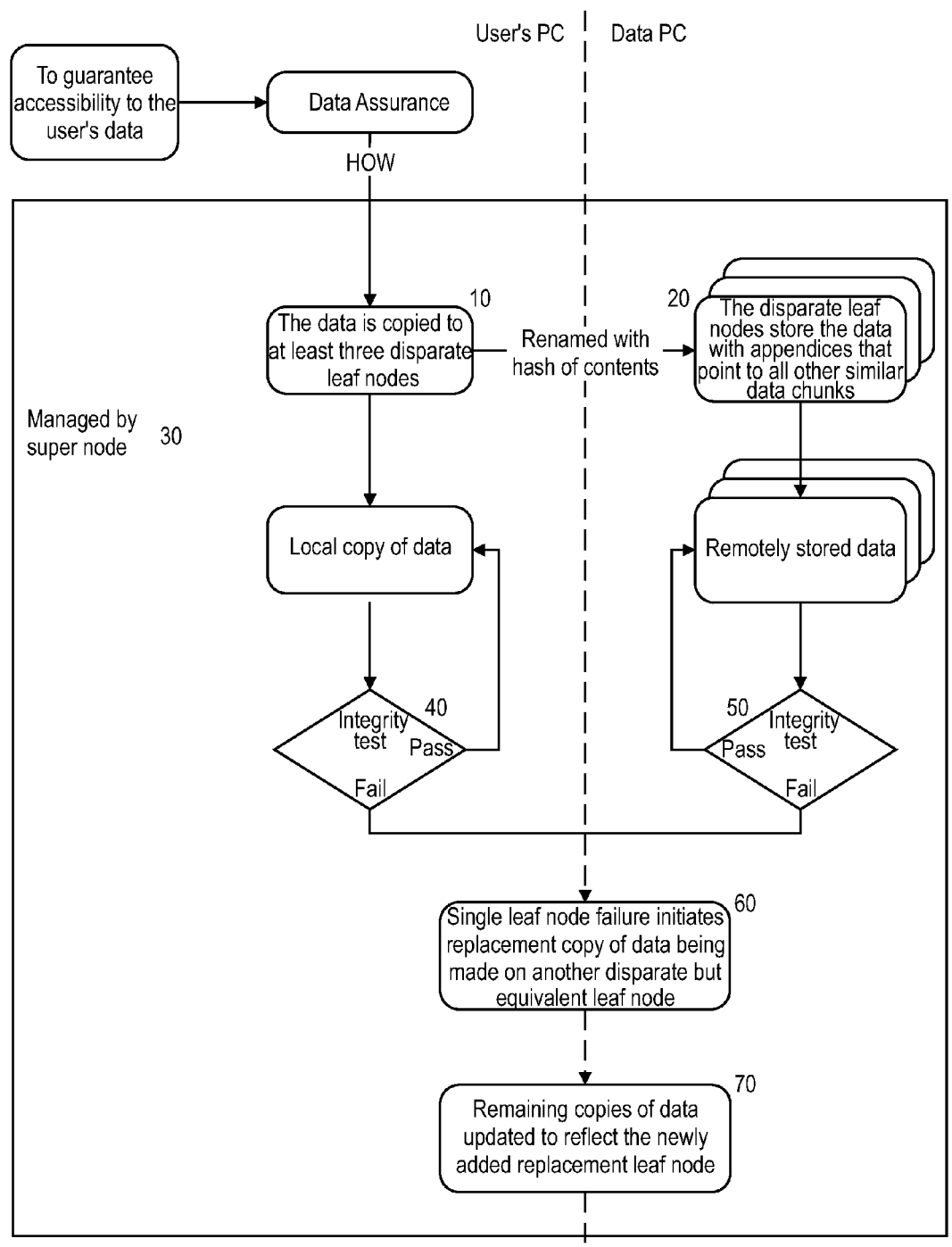
Figure 6:
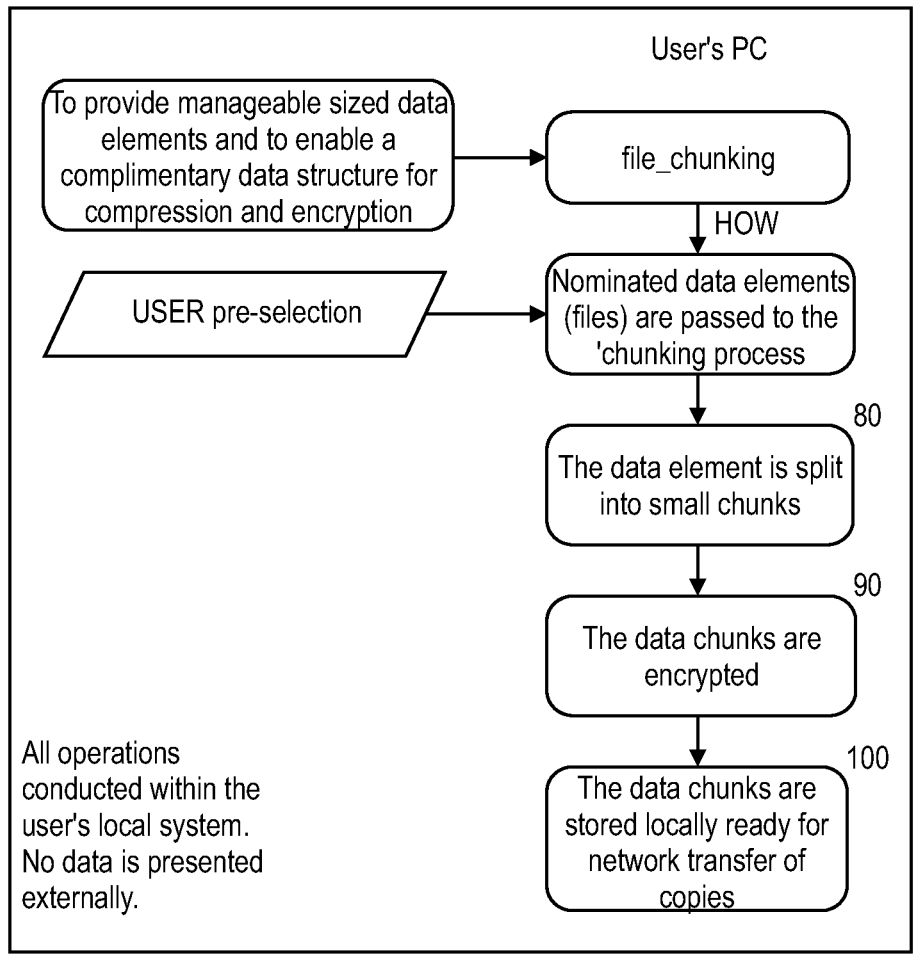
Figure 7:
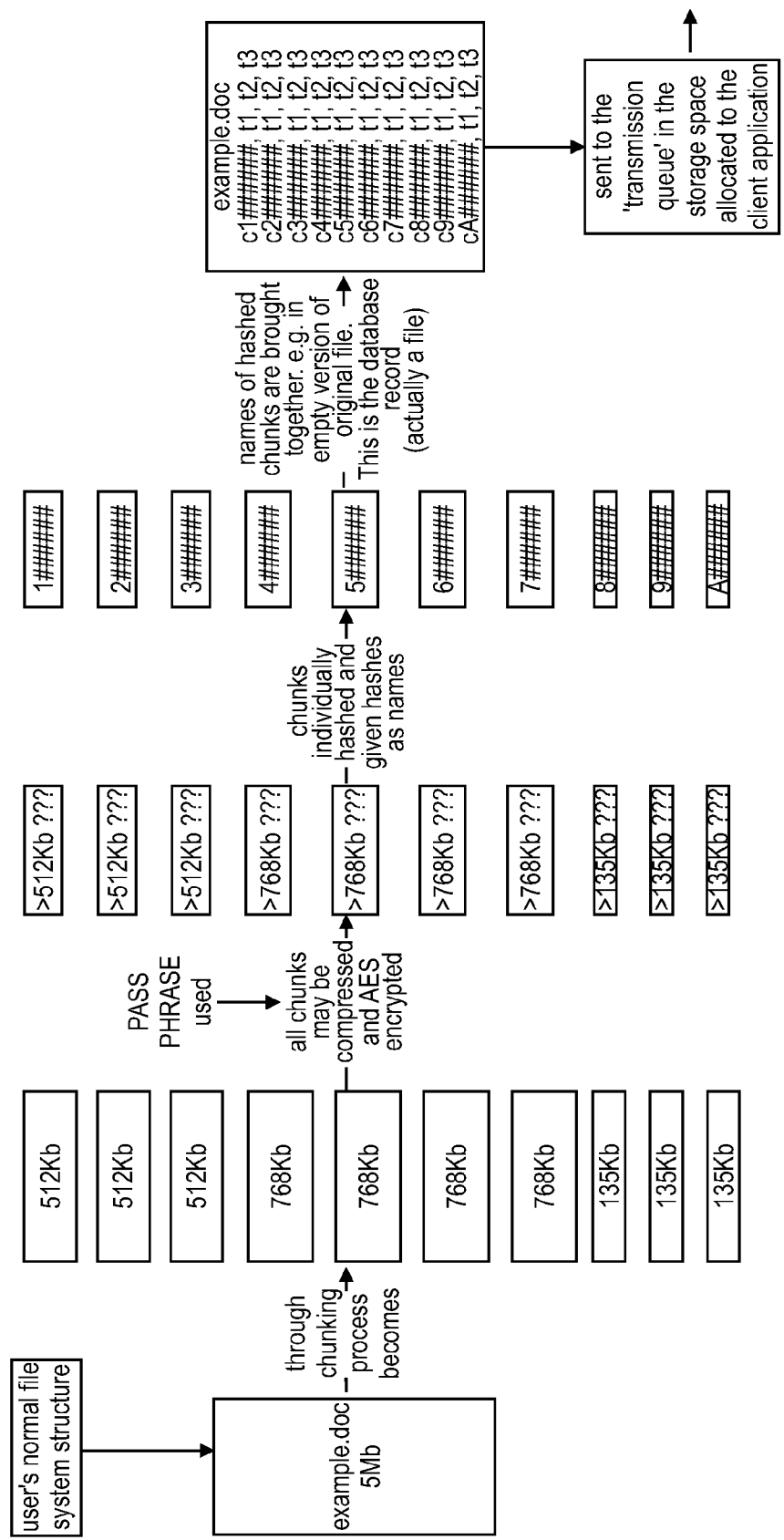
Figure 8:
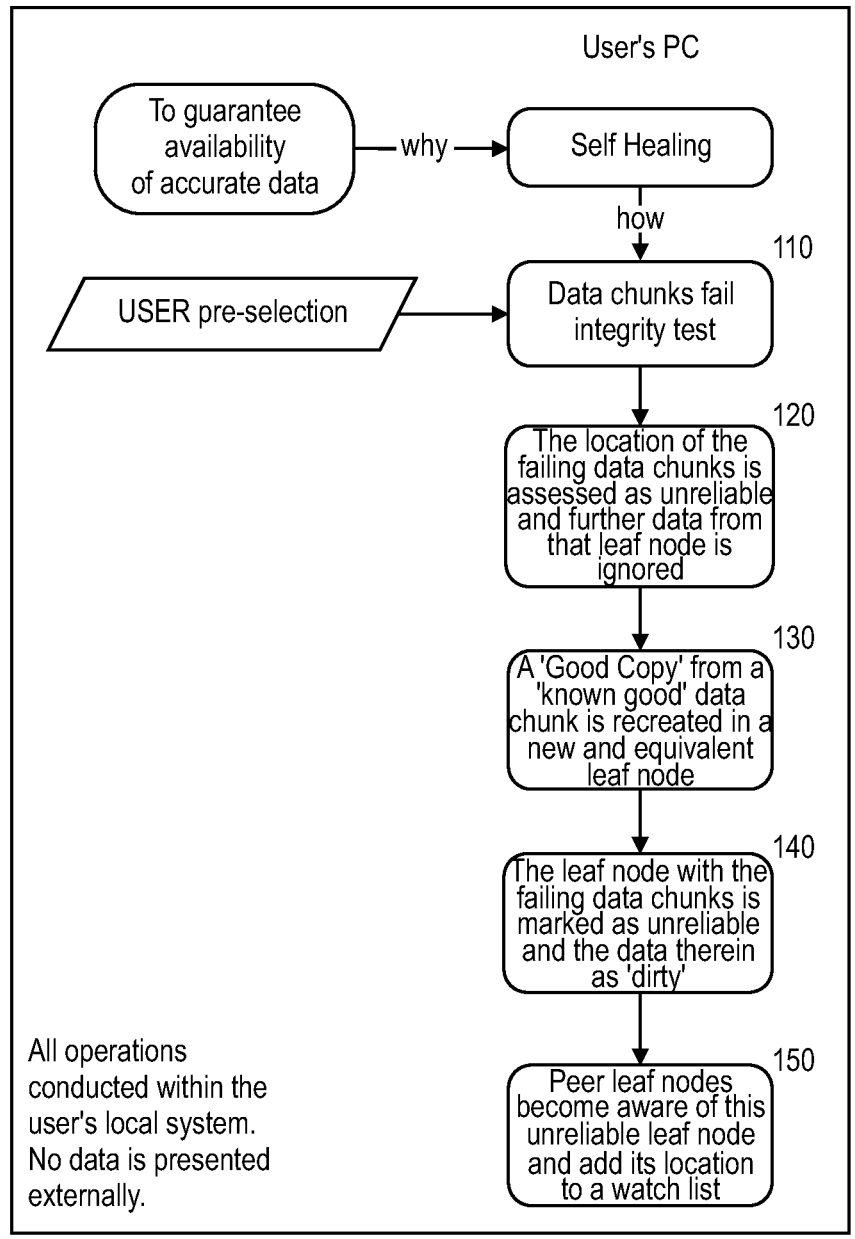
Figure 9:
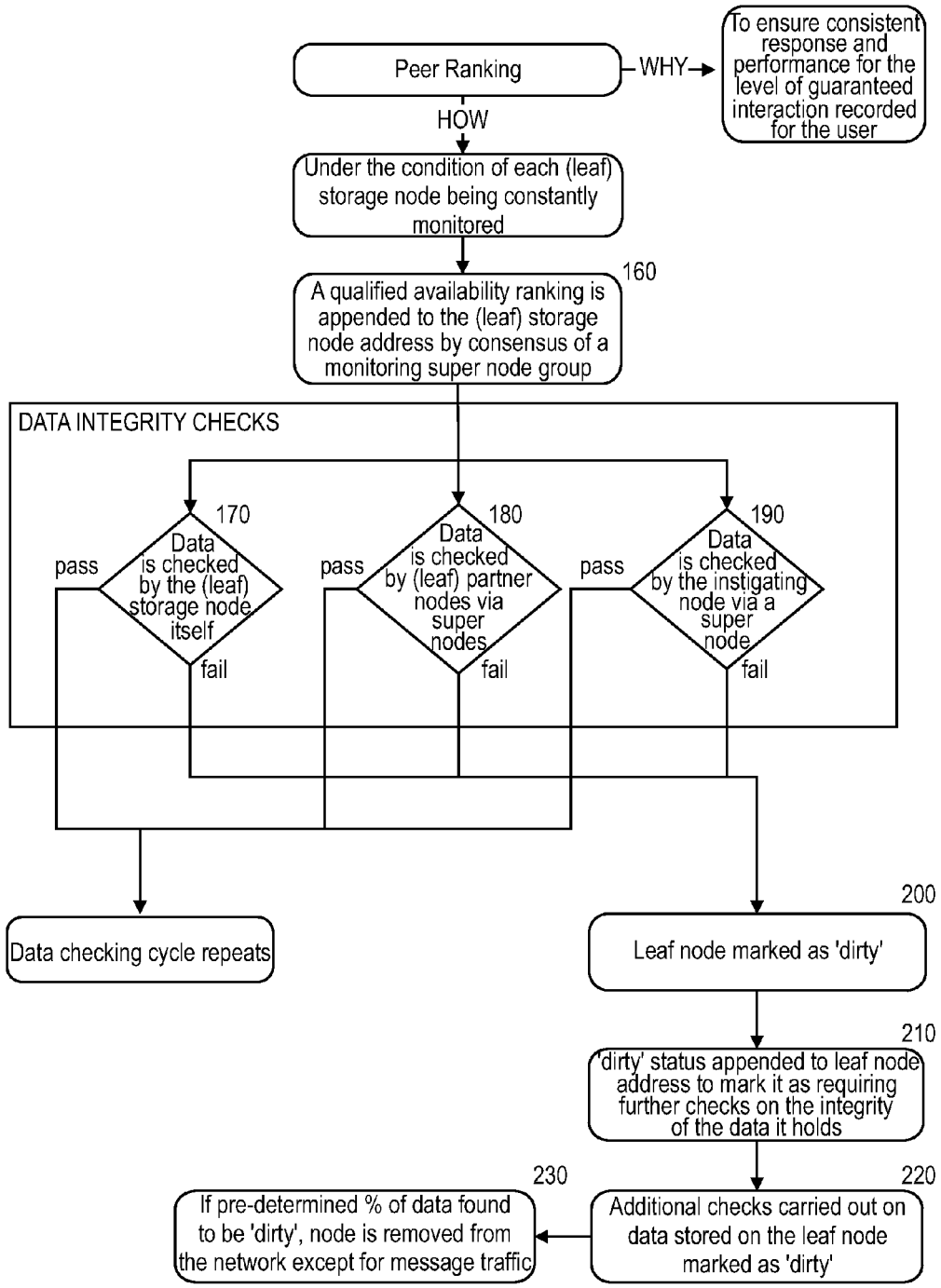
Figure 10:
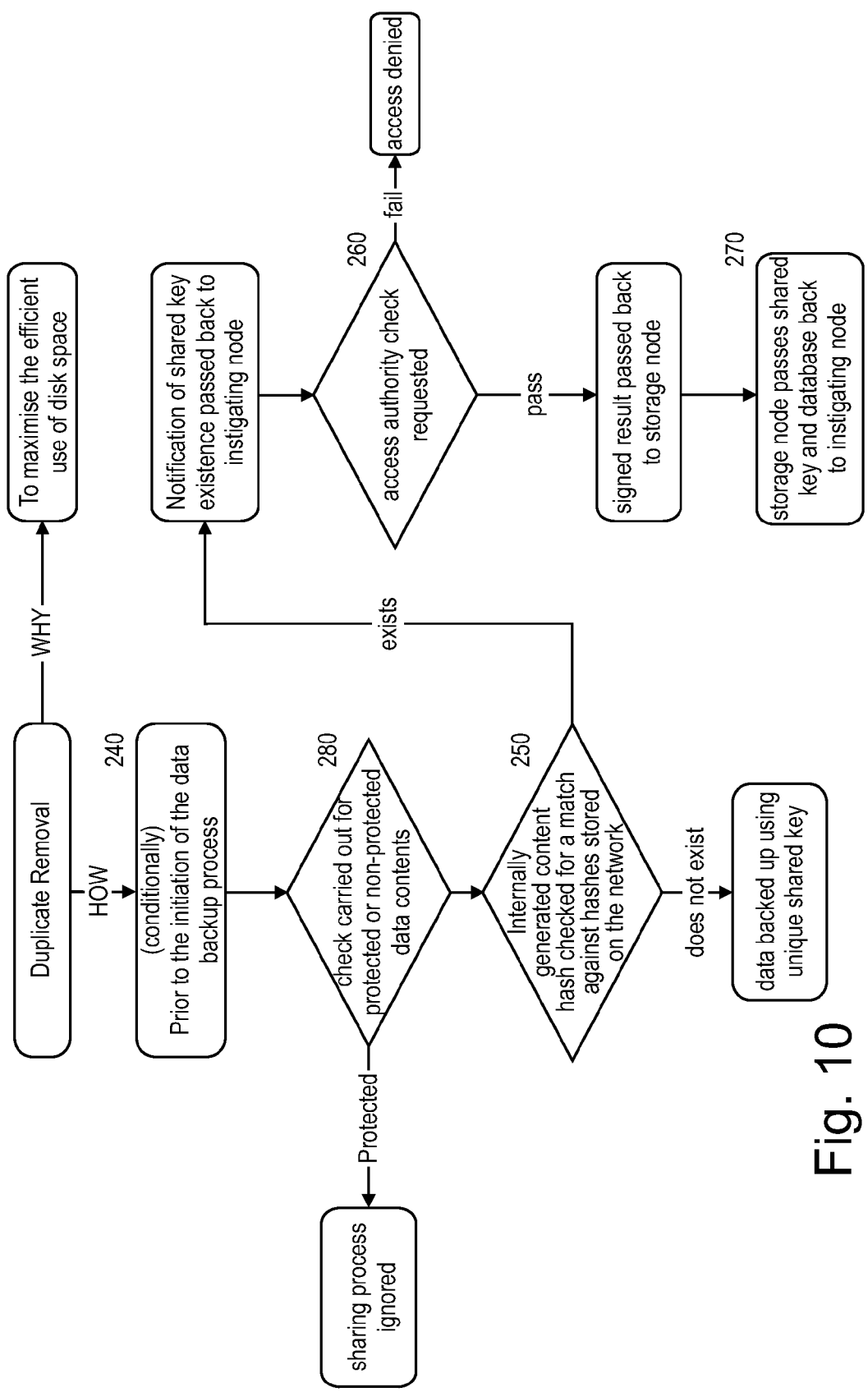

FIG. 5 illustrates a flow chart of data assurance event sequence in accordance with first embodiment of this invention FIG. 6 illustrates a flow chart of file chunking event sequence in accordance with second embodiment of this invention FIG. 7 illustrates a schematic diagram of file chunking example FIG. 8 illustrates a flow chart of self healing event sequence FIG. 9 illustrates a flow chart of peer ranking event sequence FIG. 10 illustrates a flow chart of duplicate removal event sequence With reference to FIG. 5, guaranteed accessibility to user data by data assurance is demonstrated by flow chart. The data is copied to at least three disparate locations at step (10). The disparate locations store data with an appendix pointing to the other two locations by step (20) and is renamed with hash of contents. Preferably this action is managed by another node i.e. super node acting as an intermediary by step (30).

Each local copy at user's PC is checked for validity by integrity test by step (40) and in addition validity checks by integrity test are made that the other 2 copies are also still ok by step (50).

Any single node failure initiates a replacement copy of equivalent leaf node being made in another disparate location by step (60) and the other remaining copies are updated to reflect this change to reflect the newly added replacement leaf node by step (70).

The steps of storing and retrieving are carried out via other network nodes to mask the initiator (30).

The method further comprises the step of renaming all files with a hash of their contents.

Therefore, each file can be checked for validity or tampering by running a content hashing algorithm such as (for example) MD5 or an SHA variant, the result of this being compared with the name of the file.

With reference to FIG. 6, provides a methodology to manageable sized data elements and to enable a complimentary data structure for and compression and encryption and the step is to file chunking. By user's pre-selection the nominated data elements (files are passed to chunking process. Each data element (file) is split into small chunks by step (80) and the data chunks are encrypted by step (90) to provide security for the data. The data chunks are stored locally at step (100) ready for network transfer of copies. Only the person or the group, to whom the overall data belongs, will know the location of these (100) or the other related but dissimilar chunks of data. All operations are conducted within the user's local system. No data is presented externally.

Each of the above chunks does not contain location information for any other dissimilar chunks. This provides for, security of data content, a basis for integrity checking and redundancy.

The method further comprises the step of only allowing the person (or group) to whom the data belongs, to have access to it, preferably via a shared encryption technique. This allows persistence of data.

The checking of data or chunks of data between machines is carried out via any presence type protocol such as a distributed hash table network.

On the occasion when all data chunks have been relocated (i.e. the user has not logged on for a while,) a redirection record is created and stored in the super node network, (a three copy process—similar to data) therefore when a user requests a check, the redirection record is given to the user to update their database.

This efficiently allows data resilience in cases where network churn is a problem as in peer to peer or distributed networks.

With reference to FIG. 7 which illustrates flow chart example of file chunking. User's normal file has 5 Mb document, which is chunked into smaller variable sizes e.g. 135 kb, 512 kb, 768 kb in any order. All chunks may be compressed and encrypted by using Pass phrase. Next step is to individually hash chunks and given hashes as names. Then database record as a file is made from names of hashed chunks brought together e.g. in empty version of original file (C1#######,t1,t2,t3: C2#######,t1,t2,t3 etc), this file is then sent to transmission queue in storage space allocated to client application.

With reference to FIG. 8 provides a self healing event sequence methodology. Self healing is required to guarantee availability of accurate data. As data or chunks become invalid by failing integrity test by step (110). The location of failing data chunks is assessed as unreliable and further data from the leaf node is ignored from that location by step (120). A 'Good Copy' from the 'known good' data chunk is recreated in a new and equivalent leaf node. Data or chunks are recreated in a new and safer location by step (130). The leaf node with failing data chunks is marked as unreliable and the data therein as 'dirty' by step (140). Peer leaf nodes become aware of this unreliable leaf node and add its location to watch list by step (150). All operations conducted within the user's local system. No data is presented externally.

Therefore, the introduction of viruses, worms etc. will be prevented and faulty machines/equipment identified automatically.

The network will use SSL or TLS type encryption to prevent unauthorized access or snooping.

With reference to FIG. 9, Peer Ranking id required to ensure consistent response and performance for the level of guaranteed interaction recorded for the user. For Peer Ranking each node (leaf node) monitors its own peer node's resources and availability in a scalable manner, each leaf node is constantly monitored.

Each data store (whether a network service, physical drive etc.) is monitored for availability. A qualified availability ranking is appended to the (leaf) storage node address by consensus of a monitoring super node group by step (160). A ranking figure will be appended by step (160) and signed by the supply of a key from the monitoring super node; this would preferably be agreed by more super nodes to establish a consensus for altering the ranking of the node. The new rank will preferably be appended to the node address or by a similar mechanism to allow the node to be managed preferably in terms of what is stored there and how many copies there has to be of the data for it to be seen as perpetual.

Each piece of data is checked via a content hashing mechanism for data integrity, which is carried out by the storage node itself by step (170) or by its partner nodes via super nodes by step (180) or by instigating node via super nodes by step (190) by retrieval and running the hashing algorithm against that piece of data. The data checking cycle repeats itself.

As a peer (whether an instigating node or a partner peer (i.e. one that has same chunk)) checks the data, the super node querying the storage peer will respond with the result of the integrity check and update this status on the storage peer. The instigating node or partner peer will decide to forget this data and will replicate it in a more suitable location. If data fails the integrity check the node itself will be marked as 'dirty' by step (200) and 'dirty' status appended to leaf node address to mark it as requiring further checks on the integrity of the data it holds by step (210). Additional checks are carried out on data stored on the leaf node marked as 'dirty' by step (220). If pre-determined percentage of data found to be 'dirty' node is removed from the network except for message traffic by step (230). A certain percentage of dirty data being established may conclude that this node is compromised or otherwise damaged and the network would be informed of this. At that point the node will be removed from the network except for the purpose of sending it warning messages by step (230).

This allows either having data stored on nodes of equivalent availability and efficiency or dictating the number of copies of data required to maintain reliability.

Further modifications and improvements may be added without departing from the scope of the invention herein described.

With reference to FIG. 10, duplicate data is removed to maximise the efficient use of the disk space. Prior to the initiation of the data backup process by step (240), internally generated content hash may be checked for a match against hashes stored on the internet by step (250) or a list of previously backed up data (250). This will allow only one backed up copy of data to be kept. This reduces the network wide requirement to backup data which has the exact same contents. Notification of shared key existence is passed back to instigating node by step (260) to access authority check requested, which has to pass for signed result is to be passed back to storage node. The storage node passes shared key and database back to instigating node by step (270)

Such data is backed up via a shared key which after proof of the file existing (260) on the instigating node, the shared key (270) is shared with this instigating node. The location of the data is then passed to the node for later retrieval if required.

This maintains copyright as people can only backup what they prove to have on their systems and not publicly share copyright infringed data openly on the network.

This data may be marked as protected or not protected by step (280) which has check carried out for protected or non-protected data content. The protected data ignores sharing process.

Figure 11:
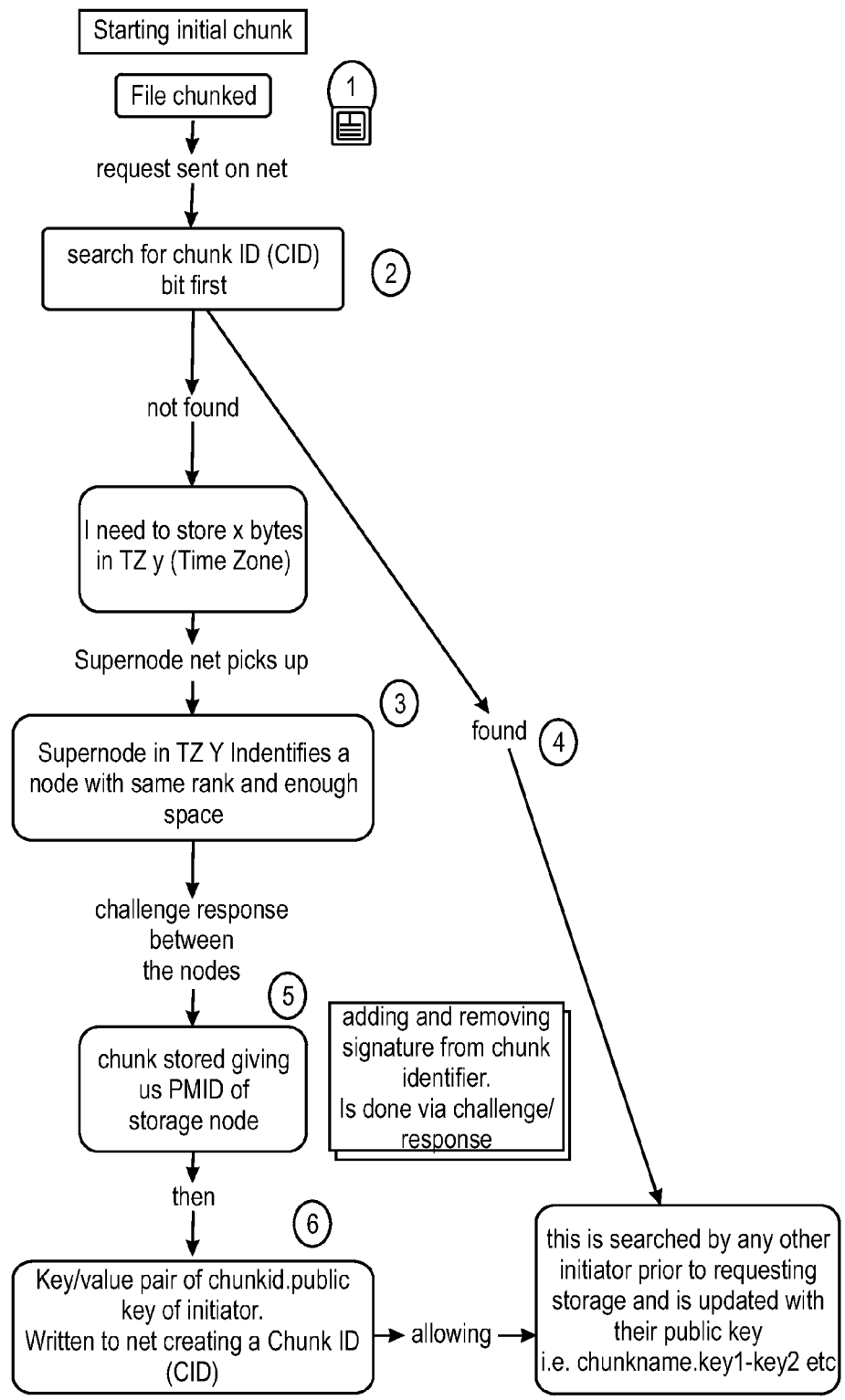

Perpetual Data (FIG. 1—PT1 and FIG. 11)

According to a related aspect of this invention, a file is chunked or split into constituent parts (1) this process involves calculating the chunk size, preferably from known data such as the first few bytes of the hash of the file itself and preferably using a modulo division technique to resolve a figure between the optimum minimum and optimum maximum chunk sizes for network transmission and storage.

Preferably each chunk is then encrypted and obfuscated in some manner to protect the data. Preferably a search of the network is carried out looking for values relating to the content hash of each of the chunks (2).

If this is found (4) then the other chunks are identified too, failure to identify all chunks may mean there is a collision on the network of file names or some other machine is in the process of backing up the same file. A back-off time is calculated to check again for the other chunks. If all chunks are on the network the file is considered backed up and the user will add their MID signature to the file after preferably a challenge response to ensure there a valid user and have enough resources to do this.

If no chunks are on the net the user preferably via another node (3) will request the saving of the first copy (preferably in distinct time zones or other geographically dispersing method).

The chunk will be stored (5) on a storage node allowing us to see the PMID of the storing node and store this.

Then preferably a Key.value pair of chunkid. public key of initiator is written to net creating a Chunk ID (CID) (6)

Storage and Retrieval (FIG. 1—P4)

According to a related aspect of this invention, the data is stored in multiple locations. Each location stores the locations of its peers that hold identical chunks (at least identical in content) and they all communicate regularly to ascertain the health of the data. The preferable method is as follows:

Preferably the data is copied to at least three disparate locations.

Preferably each copy is performed via many nodes to mask the initiator.

Preferably each local copy is checked for validity and checks are made that the preferably other 2 copies are also still valid.

Preferably any single node failure initiates a replacement copy being made in another disparate location and the other associated copies are updated to reflect this change.

Preferably the steps of storing and retrieving are carried out via other network nodes to mask the initiator.

Preferably, the method further comprises the step of renaming all files with a hash of their contents.

Preferably each chunk may alter its name by a known process such as a binary shift left of a section of the data. This allows the same content to exist but also allows the chunks to appear as three different bits of data for the sake of not colliding on the network.

Preferably each chunk has a counter attached to it that allows the network to understand easily just how many users are attached to the chunk—either by sharing or otherwise. A user requesting a 'chunk forget' will initiate a system question if they are the only user using the chunk and if so the chunk will be deleted and the user's required disk space reduced accordingly. This allows users to remove files no longer required and free up local disk space. Any file also being shared is preferably removed from the user's quota and the user's database record or data map (see later) is deleted.

Preferably this counter is digitally signed by each node sharing the data and therefore will require a signed 'forget' or 'delete' command. Preferably even 'store', 'put', 'retrieve' and 'get' commands should also be either digitally signed or preferably go through a PKI challenge response mechanism.

To ensure fairness preferably this method will be monitored by a supernode or similar to ensure the user has not simply copied the data map for later use without giving up the disk space for it. Therefore the user's private ID public key will be used to request the forget chunk statement. This will be used to indicate the user's acceptance of the 'chunk forget' command and allow the user to recover the disk space. Any requests against the chunk will preferably be signed with this key and consequently rejected unless the user's system gives up the space required to access this file.

Preferably each user storing a chunk will append their signed request to the end of the chunk in an identifiable manner i.e. prefixed with 80—or similar.

Forgetting the chunk means the signature is removed from the file. This again is done via a signed request from the storage node as with the original backup request.

Preferably this signed request is another small chunk stored at the same location as the data chunk with an appended postfix to the chunk identifier to show a private ID is storing this chunk. Any attempt by somebody else to download the file is rejected unless they first subscribe to it, i.e. a chunk is called 12345 so a file is saved called 12345 <signed store request>. This will allow files to be forgotten when all signatories to the chunk are gone. A user will send a signed 'no store' or 'forget' and their ID chunk will be removed, and in addition if they are the last user storing that chunk, the chunk is removed. Preferably this will allow a private anonymous message to be sent upon chunk failure or damage allowing a proactive approach to maintaining clean data.

Preferably as a node fails the other nodes can preferably send message to all sharers of the chunk to identify the new location of the replacement chunk.

Preferably any node attaching to a file then downloading immediately should be considered an alert and the system may take steps to slow down this node's activity or even halt it to protect data theft.

Figure 12:
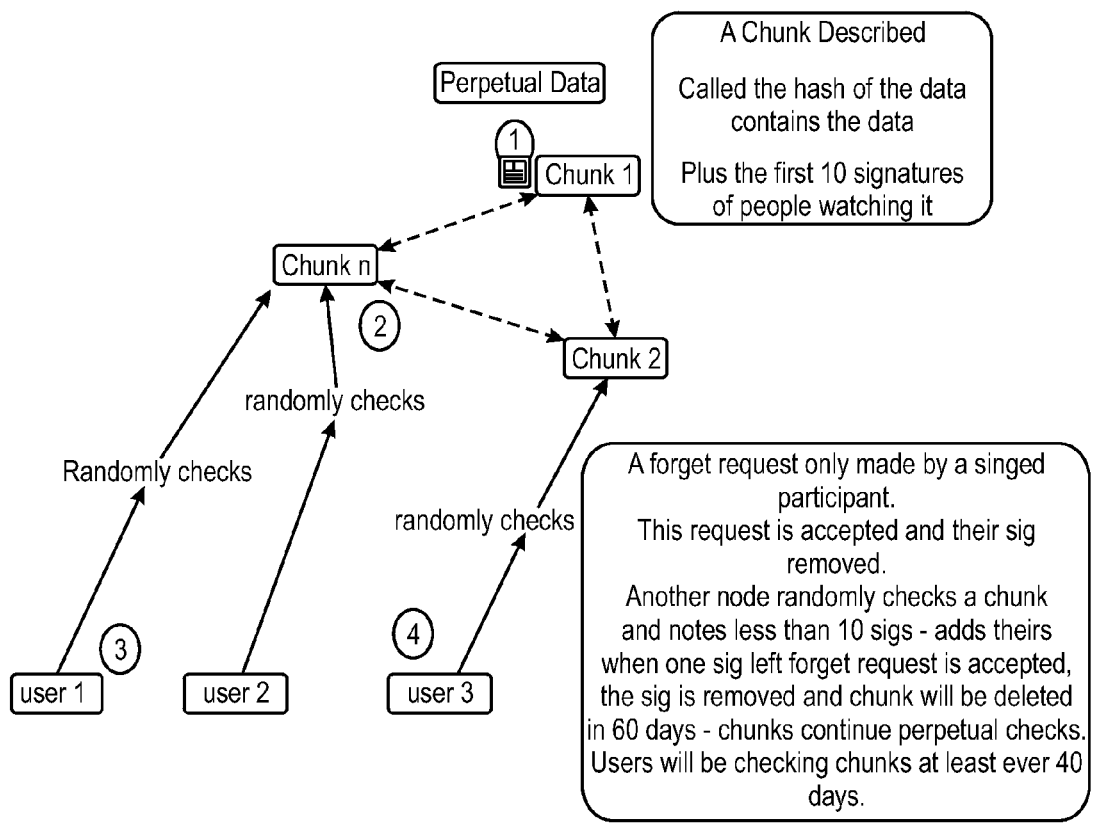

Chunk Checks: (FIG. 1—P9 and FIG. 12)

1. Storage node containing chunk 1 checks its peers. As each peer is checked it reciprocates the check. These checks are split into preferably 2 types:
   a. Availability check (i.e. simple network ping)
   b. Data integrity check—in this instance the checking node takes a chunk and appends random data to it and takes a hash of the result. It then sends the random data to the node being checked and requests the hash of the chunk with the random data appended. The result is compared with a known result and the chunk will be assessed as either healthy or not. If not, further checks with other nodes occur to find the bad node.

2. There may be multiple storage nodes depending on the rating of machines and other factors. The above checking is carried out by all nodes from 1 to n (where n is total number of storage nodes selected for the chunk). Obviously a poorly rated node will require to give up disk space in relation to the number of chunks being stored to allow perpetual data to exist. This is a penalty paid by nodes that are switched off.

3. The user who stored the chunk will check on a chunk from 1 storage node randomly selected. This check will ensure the integrity of the chunk and also ensure there are at least 10 other signatures existing already for the chunk. If there are not and the user's ID is not listed, the user signs the chunk.

4. This shows another example of another user checking the chunk. Note that the user checks X (40 days in this diagram) are always at least 75% of the forget time retention (Y) (i.e. when a chunk is forgotten by all signatories it is retained for a period of time Y). This is another algorithm that will continually develop.

Storage of Additional Chunks: (FIG. 12)

1. maidsafe.net program with user logged in (so MID exists) has chunked a file. It has already stored a chunk and is now looking to store additional chunks. Therefore a Chunk ID (CID) should exist on the net. This process retrieves this CID.

2. The CID as shown in storing initial chunk contains the chunk name and any public keys that are sharing the chunk. In this instance it should only be our key as we are first ones storing the chunks (others would be in a back-off period to see if we back other chunks up). We shift the last bit (could be any function on any bit as long as we can replicate it)

3. We then check we won't collide with any other stored chunk on the net—i.e. it does a CID search again.

4. We then issue our broadcast to our supemodes (i.e. the supemodes we are connected to) stating we need to store X bytes and any other information about where we require to store it (geographically in our case—time zone (TZ))

5. The supernode network finds a storage location for us with the correct rank etc.

6. The chunk is stored after a successful challenge response i.e. In the maidsafe.net network. MIDs will require to ensure they are talking or dealing with validated nodes, so to accomplish this a challenge process is carried out as follows: sender [S] receiver [R]
   [S] I wish to communicate (store retrieve forget data etc.) and I am MAID
   [R] retrieves MAID public key from DHT and encrypts a challenge (possibly a very large number encrypted with the public key retrieved)
   [S] gets key and decrypts and encrypts [R] answer with his challenge number also encrypted with [R]'s public key
   [R] receives response and decrypts his challenge and passes back answer encrypted again with [S] public key (Communication is now authenticated between these two nodes.)

7. The CID is then updated with the second chunk name and the location it is stored at. This process is repeated for as many copies of a chunk that are required.

8. Copies of chunks will be dependent on many factors including file popularity (popular files may require to be more dispersed closer to nodes and have more copies. Very poorly ranked machines may require an increased amount of chunks to ensure they can be retrieved at any time (poorly ranked machines will therefore have to give up more space.)

Security Availability (FIG. 1—P3)

According to a related aspect of this invention, each file is split into mall chunks and encrypted to provide security for the data. Only the person or the group, to whom the overall data belongs, will know the location of the other related but dissimilar chunks of data.

Preferably, each of the above chunks does not contain location information for any other dissimilar chunks; which provides for security of data content, a basis for integrity checking and redundancy.

Preferably, the method further comprises the step of only allowing the person (or group) to whom the data belongs to have access to it, preferably via a shared encryption technique which allows persistence of data.

Preferably, the checking of data or chunks of data between machines is carried out via any presence type protocol such as a distributed hash table network.

Preferably, on the occasion when all data chunks have been relocated, i.e. the user has not logged on for a while, a redirection record is created and stored in the super node network, (a three copy process—similar to data) therefore when a user requests a check, the redirection record is given to the user to update their database, which provides efficiency that in turn allows data resilience in cases where network churn is a problem as in peer to peer or distributed networks. This system message can be preferably passed via the messenger system described herein.

Preferably the system may simply allow a user to search for his chunks and through a challenge response mechanism, locate and authenticate himself to have authority to get/forget this chunk.

Further users can decide on various modes of operation preferably such as maintain a local copy of all files on their local machine, unencrypted or chunked or chunk and encrypt even local files to secure machine (preferably referred to as off line mode operation) or indeed users may decide to remove all local data and rely completely on preferably maidsafe.net or similar system to secure their data.

Self Healing (FIG. 1—P2)

According to a related aspect of this invention, a self healing network method is provided via the following process;

As data or chunks become invalid—data is ignored from that location

Data or chunks are recreated in a new and safer location.

The original location is marked as bad.

Peers note this condition and add the bad location to a watch list.

This will prevent the introduction of viruses; worms etc. will allow faulty machines/equipment to be identified automatically.

Preferably, the network layer will use SSL or TLS channel encryption to prevent unauthorised access or snooping.

Figure 13:
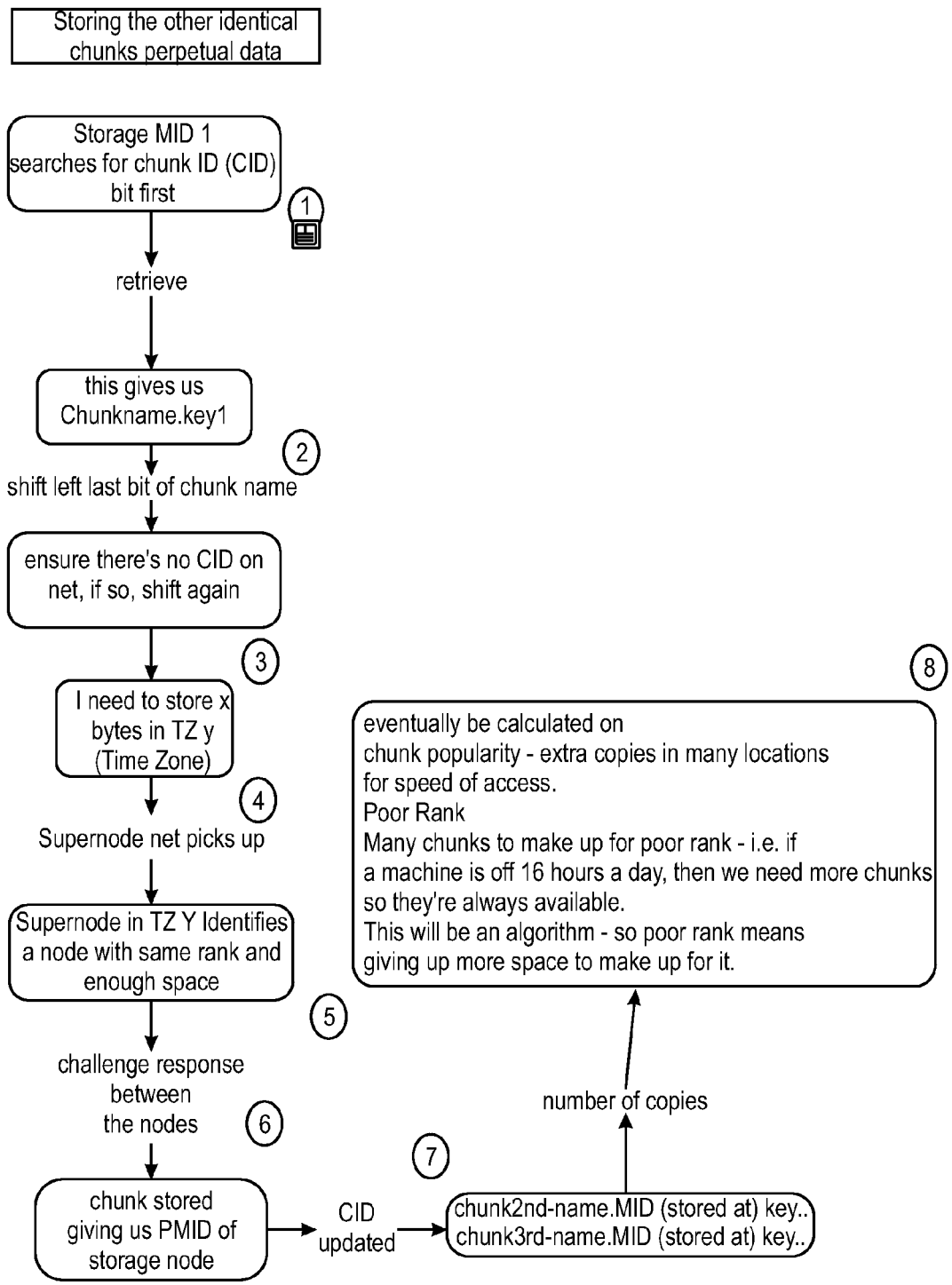
Figure 14:
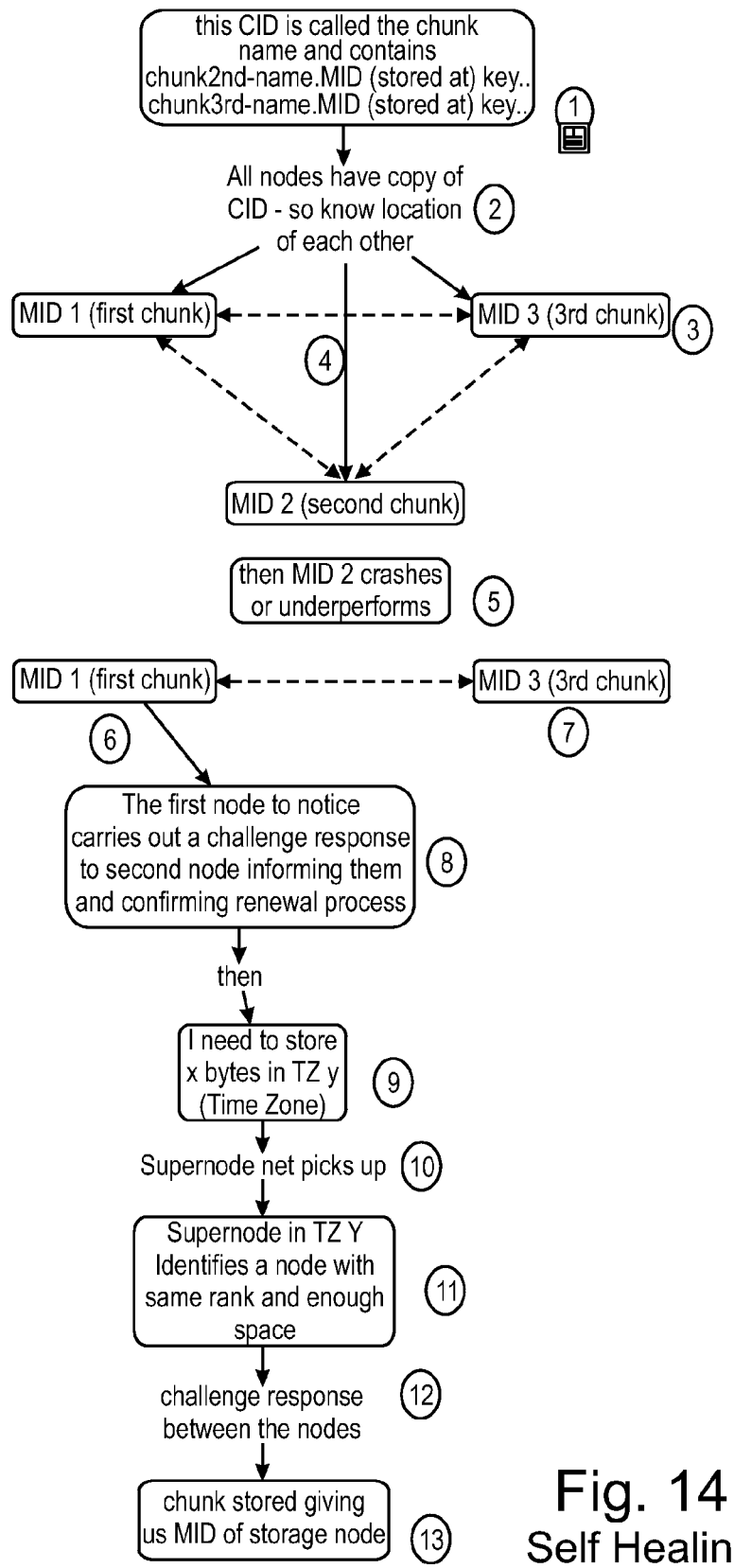

Self Healing (FIG. 13)

1. A data element called a Chunk ID (CID) is created for each chunk. Added to this is the 'also stored at[1] MID for the other identical chunks. The other chunk names are also here as they may be renamed slightly (i.e. by bit shifting a part of the name in a manner that calculable).

2. All storing nodes (related to this chunk) have a copy of this CID file or can access it at any stage from the DHT network, giving each node knowledge of all others.

3. Each of the storage nodes have their copy of the chunk.

4. Each node queries its partner's availability at frequent intervals. On less frequent intervals a chunk health check is requested. This involves a node creating some random data and appending this to it's chunk and taking the hash. The partner node will be requested to take the random data and do likewise and return the hash result. This result is checked against the result the initiator had and chunk is then deemed healthy or not. Further tests can be done as each node knows the hash their chunk should create and can self check n that manner on error and report a dirty node.

5. Now we have a node fail (creating a dirty chunk)

6. The first node to note this carries out a broadcast to other nodes to say it is requesting a move of the data.

7. The other nodes agree to have CID updated (they may carry out their own check to confirm this).

8. A broadcast is sent to the supernode network closest to the storage node that failed, to state a re-storage requirement.

9. The supernode network picks up the request.

10. The request is to the supernode network to store x amount of data at a rank of y.

11. A supernode will reply with a location

12. The storage node and new location carry out a challenge response request to validate each other.

13. The chunk is stored and the CID is updated and signed by the three or 1479 more nodes storing the chunk.

Peer Ranking (FIG. 1—P1)

According to a related aspect of this invention, there is the addition of a peer ranking mechanism, where each node (leaf node) monitors its own peer node's resources and availability in a scalable manner. Nodes constantly perform this monitoring function.

Each data store (whether a network service, physical drive etc.) is monitored for availability. A ranking figure is appended and signed by the supply of a key from the monitoring super node, this being preferably agreed by more super nodes to establish a consensus before altering the ranking of the node. Preferably, the new rank will be appended to the node address or by a similar mechanism to allow the node to be managed in terms of what is stored there and how many copies there has to be of the data for it to be seen as perpetual.

Each piece of data is checked via a content hashing mechanism. This is preferably carried out by the storage node itself or by its partner nodes via super nodes or by an instigating node via super nodes by retrieving and running the hashing algorithm against that piece of data.

Preferably, as a peer (whether an instigating node or a partner peer (i.e. one that has same chunk)) checks the data, the super node querying the storage peer will respond with the result of the integrity check and update this status on the storage peer. The instigating node or partner peer will decide to forget this data and will replicate it in a more suitable location. If data fails the integrity check, the node itself will be marked as 'dirty' and this status will preferably be appended to the node's address for further checks on other data to take this into account. Preferably a certain percentage of dirty data being established may conclude that this node is compromised or otherwise damaged and the network would be informed of this. At that point the node will be removed from the network except for the purpose of sending it warning messages.

In general, the node ranking figure will take into account at least; availability of the network connection, availability of resources, time on the network with a rank (later useful for effort based trust model), amount of resource (including network resources) and also the connectivity capabilities of any node (i.e. directly or indirectly contactable)

This then allows data to be stored on nodes of equivalent availability and efficiency, and to determine the number of copies of data required to maintain reliability.

Figure 15:
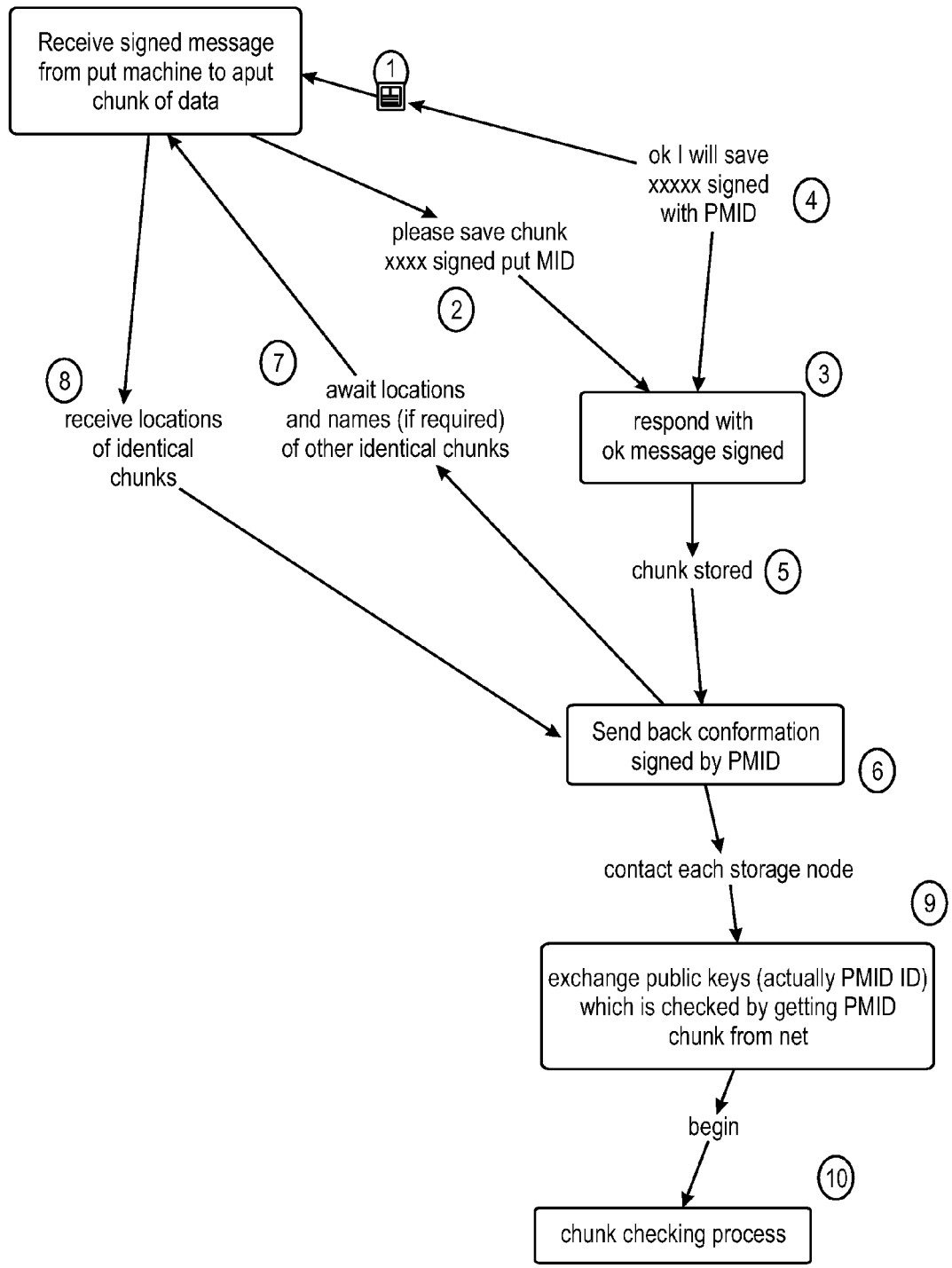

Aput: (FIG. 15)

Here the MID is the MID of the machine saving data to the net and the PMID is the ID of the storage node chunk server. The communication is therefore between a maidsafe.net application with a logged in user (to provide MID) and a chunking system on the net somewhere (storage node).

1. A message signed with a user's MID (checked by getting the MAID packet from the net) is received requesting storage of a data chunk.

2. This message is a specific message stating the storage node's ID (PMID) and the chunk name to be saved and signed (i.e. this is a unique message)

3. The chunk server decides if it will store the chunk.

4. A signed message is returned stating if PMID will store this chunk (chunkID).

5. The chunk is stored and checked (SHA check)

6. A message is sent back to state that the chunk is saved and is ok. This is signed by the PMID of the chunk server.

7. The chunk server awaits the locations of the other identical chunks.

8. Locations of the identical chunks returned to the chunk server signed with the MID.

9. Each storage node is contacted and public keys exchanged (PMIDs)

10. The chunk checking process is initiated.

Figure 16:
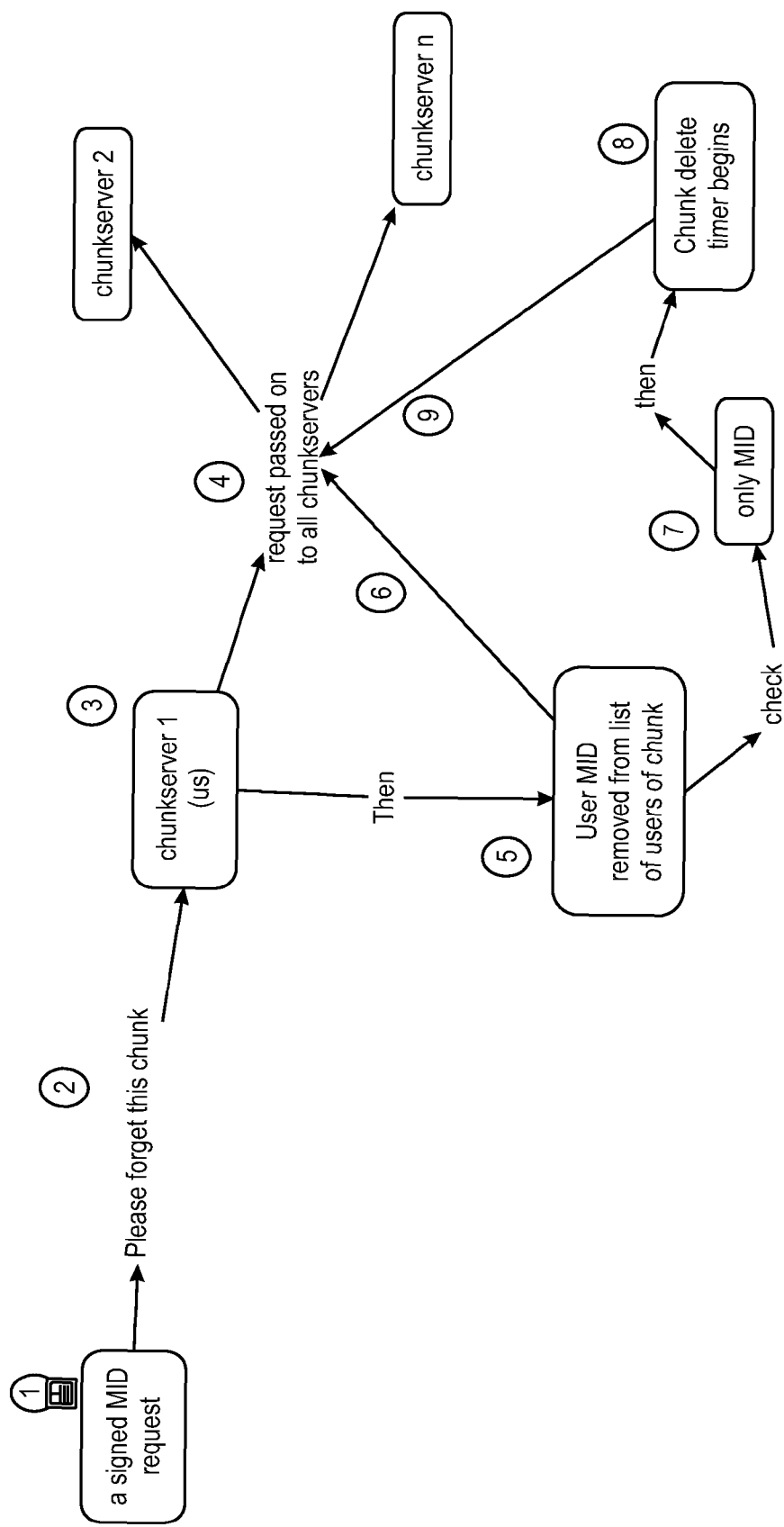

Aforget (FIG. 16)

1. A user has requested that a file should be deleted from his backup (forgotten). The system signs a request using the user MID.

2. The request is sent to a chunk server (storage node).

3. The storage node picks up the request

4. The storage node sends the signed request to the other storage nodes that have this chunk.

5. The MID is checked as being on the list of MIDs that are watching the chunk (remember only a few—20 in our case are ever listed)

6. The other storage nodes are notified of this.

7. If this is the only MID listed then all owners are possibly gone.

8. Chunk delete times begins, this timer will always be higher than a user check interval—i.e. timer of 60 days—user check interval 40 days.

9. This information is also passed to other storage nodes.

Duplicate Removal (FIG. 1—P5)

According to a related aspect of this invention, prior to data being backed up, the content hash may be checked against a list of previously backed up data. This will allow only one backed up copy of data to be kept, thereby reducing the network wide requirement to backup data that has the exact same content. Preferably this will be done via a simple search for existence on the net of all chunks of a particular file.

Preferably such data is backed up via a shared key or mechanism of appending keys to chunks of data. After proof of the file existing on the instigating node, the shared key is shared with the instigating node and the storing node issues a challenge response to add their ID to the pool if it is capable of carrying out actions on the file such as get/forget (delete). The location of the data is then passed to the node for later retrieval if required.

This maintains copyright as people can only backup what they prove to have on their systems and not easily publicly share copyright infringed data openly on the network.

Preferably, data may be marked as protected or not protected. Preferably protected data ignores sharing process.

Chunking (FIG. 1—P7)

According to a related aspect of this invention, files are split preferably using an algorithm to work out the chunk size into several component parts. The size of the parts is preferably worked out from known information about the file as a whole, preferably the hash of the complete file. This information is run through an algorithm such as adding together the first x bits of the known information and using modulo division to give a chunk size that allows the file to preferably split into at least three parts.

Preferably known information from each chunk is used as an encryption key. This is preferably done by taking a hash of each chunk and using this as the input to an encryption algorithm to encrypt another chunk in the file. Preferably this is a symmetrical algorithm such as AES256.

Preferably this key is input into a password creating algorithm such as pbkdf and an initial vector and key calculated from that. Preferably the iteration count for the pbkdf is calculated from another piece of known information, preferably the sum of bits of another chunk or similar.

Preferably each initial chunk hash and the final hash after encryption are stored somewhere for later decryption.

Figure 17:
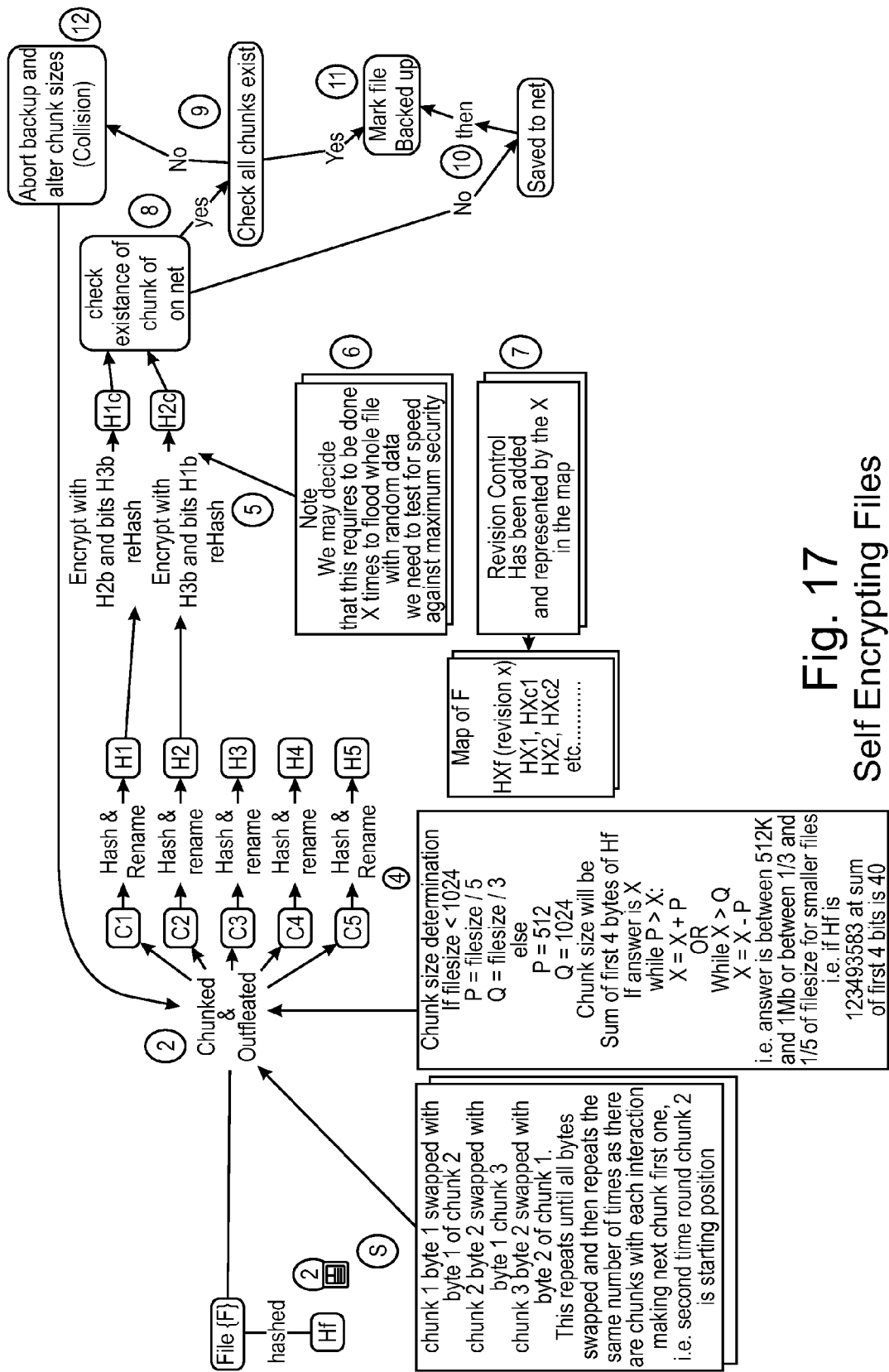

Self Encrypting Files (FIG. 1—PT2 and FIG. 17)

1. Take a content hash of a file or data element
2. Chunk a file with preferably a random calculable size i.e. based on an algorithm of the content hash (to allow recovery of file). Also obfuscate the file such as in 3
3. Obfuscate the chunks to ensure safety even if encryption is eventually broken (as with all encryption if given enough processing power and time)
   a. chunk 1 byte 1 swapped with byte 1 of chunk 2
   b. chunk 2 byte 2 swapped with byte 1 chunk 3
   c. chunk 3 byte 2 swapped with byte 2 of chunk 1
   d. This repeats until all bytes swapped and then repeats the same number of times as there are chunks with each iteration making next chunk first one
   e.—i.e. second time round chunk 2 is starting position
4. Take hash of each chunk and rename chunk with its hash.
5. Take h2 and first x bytes of h3 (6 in our example case) and either use modulo division or similar to get a random number between 2 fixed parameter (in our case 1000) to get a variable number. Use the above random number and h2 as the encryption key to encrypt hi or use h2 and the random number as inputs to another algorithm (pdbfk2 in our case) to create a key and iv. (initialisation vector)
6. This process may be repeated multiple times to dilute any key throughout a series of chunks.
7. Chunk name i.e. hi (unencrypted) and h1c (and likewise for each chunk) written to a location for later recovery of the data. Added to this we can simply update such a location with new chunks if a file has been altered, thereby creating a revision control system where each file can be rebuilt to any previous state.
8. The existence of the chunk will be checked on the net to ensure it is not already backed up. All chunks may be checked at this time.
9. If a chunk exists all chunks must be checked for existence.
10. The chunk is saved
11. The file is marked as backed up.
12. If a collision is detected the process is redone altering the original size algorithm (2) to create a new chunk set, each system will be aware of this technique and will do the exact same process till a series of chunks do not collide. There will be a back off period here to ensure the chunks are not completed due to the fact another system is backing up the same file. The original chunk set will be checked frequently in case there are false chunks or ones that have been forgotten. If the original names become available the file is reworked using these parameters.

Duplicate Removal (FIG. 1—P5)

According to a related aspect of this invention, data chunked and ready for storing can be stored on a distributed network but a search should preferably be carried out for the existence of all associated chunks created. Preferably the locations of the chunks have the same ranking (From earlier ranking system) as user or better, otherwise the existing chunks on the net are promoted to a location of equivalent rank at least. If all chunks exist then the file is considered as already backed up. If less than all chunks exist then this will preferably be considered as a collision (after a time period) and the file will be re chunked using the secondary algorithms (preferably just adjusted file sizes). This allows duplicate files on any 2 or more machines to be only backed up once although through perpetual data several copies will exist of each file, this is limited to an amount that will maintain perpetual data.

Encrypt-Decrypt (FIG. 1—P8)

According to a related aspect of this invention, the actual encrypting and decrypting is carried out via knowledge of the file's content and this is somehow maintained (see next). Keys will be generated and preferably stored for decrypting. Actually encrypting the file will preferably include a compression process and further obfuscation methods. Preferably the chunk will be stored with a known hash preferably based on the contents of that chunk.

Decrypting the file will preferably require the collation of all chunks and rebuilding of the file itself. The file may preferably have its content mixed up by an obfuscation technique rendering each chunk useless on its own.

Preferably every file will go through a process of byte (or preferably bit) swapping between its chunks to ensure the original file is rendered useless without all chunks.

This process will preferably involve running an algorithm which preferably takes the chunk size and then distributes the bytes in a pseudo random manner preferably taking the number of chunks and using this as an iteration count for the process. This will preferably protect data even in event of somebody getting hold of the encryption keys—as the chunks data is rendered useless even if transmitted in the open without encryption.

This defends against somebody copying all data and storing for many years until decryption of today's algorithms is possible, although this is many years away.

This also defends against somebody; instead of attempting to decrypt a chunk by creating the enormous amount of keys possible, (in the region of $2^{54}$) rather instead creating the keys and presenting chunks to all keys—if this were possible (which is unlikely) a chunk would decrypt. The process defined here makes this attempt useless.

All data will now be considered to be diluted throughout the original chunks and preferably additions to this algorithm will only strengthen the process.

Identify Chunks (FIG. 1—P9)

According to a related aspect of this invention, a chunk's original hash or other calculable unique identifier will be stored. This will be stored with preferably the final chunk name. This aspect defines that each file will have a separate map preferably a file or database entry to identify the file and the name of its constituent parts. Preferably this will include local information to users such as original location and rights (such as a read only system etc.). Preferably some of this information can be considered shareable with others such as filename, content hash and chunks names.

ID Data with Small File (FIG. 1—P11)

According to a related aspect of this invention; these data maps may be very small in relation to the original data itself allowing transmission of files across networks such as the internet with extreme simplicity, security and bandwidth efficiency. Preferably the transmission of maps will be carried out in a very secure manner, but failure to do this is akin to currently emailing a file in its entirety.

This allows a very small file such as the data map or database record to be shared or maintained by a user in a location not normally large enough to fit a file system of any great size, such as on a PDA or mobile phone. The identification of the chunk names, original names and final names are all that is required to retrieve the chunks and rebuild the file with certainty.

With data maps in place a user's whole machine, or all its data, can exist elsewhere. Simply retrieving the data maps of all data, is all that is required to allow the user to have complete visibility and access to all their data as well as any shared files they have agreed to.

Revision Control (FIG. 1—PIO)

According to a related aspect of this invention, as data is updated and the map contents alter to reflect the new contents, this will preferably not require the deletion or removal of existing chunks, but instead allow the existing chunks to remain and the map appended to with an indication of a new revision existing. Preferably further access to the file will automatically open the last revision unless requested to open an earlier revision.

Preferably revisions of any file can be forgotten or deleted (preferably after checking the file counter or access list of sharers as above). This will allow users to recover space from no longer required revisions.

Create Map of Maps (FIG. 1—P15)

According to a related aspect of this invention, data identifiers, preferably data maps as mentioned earlier, can be appended to each other in a way that preferably allows a single file or database record to identity-several files in one as-a share. Such a share can be private to the individual, thereby replacing the directory structure of files that users are normally used to, and replacing this with a new structure of shares very similar to volumes or filing cabinets as this is more in line with normal human nature and should make things simpler.

Share Maps (FIG. 1—P16)

According to a related aspect of this invention, this map of maps will preferably identify the users connected to it via some public ID that is known to each other user, with the map itself will being passed to users who agree to join the share. This will preferably be via an encrypted channel such as ms messenger or similar. This map may then be accessed at whatever rank level users have been assigned. Preferably there will be access rights such as read/delete/add/edit as is typically used today. As a map is altered, the user instigating this is checked against the user list in the map to see if this is allowed. If not, the request is ignored but preferably the users may then save the data themselves to their own database or data maps as a private file or even copy the file to a share they have access rights for. These shares will preferably also exhibit the revision control mechanism described above.

Preferably joining the share will mean that the users subscribe to a shared amount of space and reduce the other subscription, i.e. a 10 Gb share is created then the individual gives up 10 Gb (or equivalent dependent on system requirements which may be a multiple or divisor of 10 Gb). Another user joining means they both have a 5 Gb space to give up and 5 users would mean they all have a 2 Gb or equivalent space to give up. So with more people sharing, requirements on all users reduce.

Figure 18:
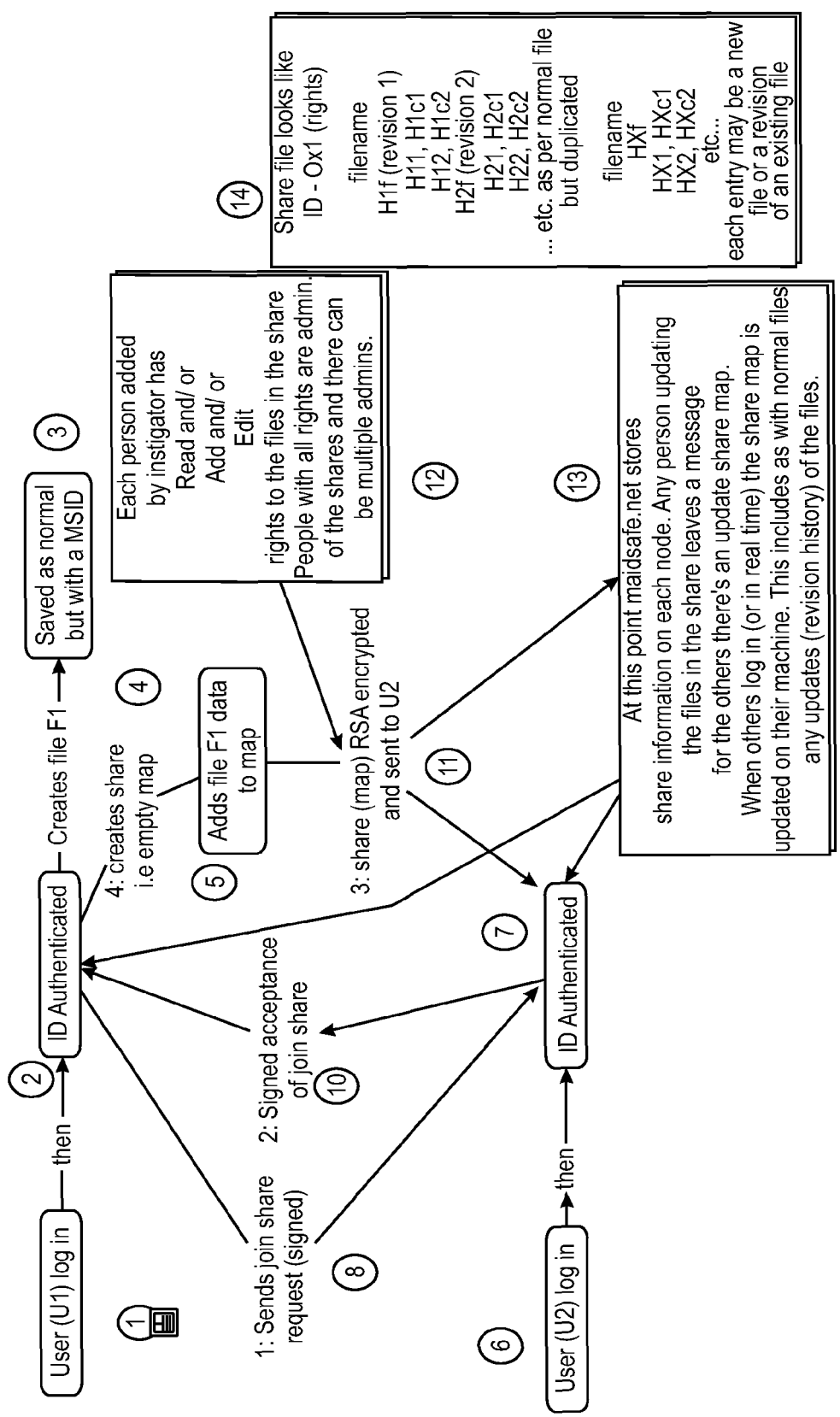

Shared Access to Private Files (FIG. 1—PT5 and FIG. 18)

1. User 1 logs on to network
2. Authenticates ID—i.e. gets access to his public and private keys to sign messages. This should NOT be stored locally but should have been retrieved from a secure location—anonymously and securely.
3. User 1 saves a file as normal (encrypted, obfuscated, chunked, and stored on the net via a signed and anonymous ID. This ID is a special maidsafe.net Share ID (MSID) and is basically a new key pair created purely for interacting with the share users—to mask the user's MID (i.e. cannot be tied to MPID via a share). So again the MSID is a key pair and the ID is the hash of the public key—this public key is stored in a chunk called the hash and signed and put on the net for others to retrieve and confirm that the public key belongs to the hash.
4. User creates a share—which is a data map with some extra elements to cover users and privileges.
5. File data added to file map is created in the backup process, with one difference, this is a map of maps and may contain many files—see 14
6. User 2 logs in
7. User 2 has authentication details (i.e. their private MPID key) and can sign/decrypt with this MPID public key.
8. User 1 sends a share join request to user 2 (shares are invisible on the net—i.e. nobody except the sharers to know they are there).
9. User 1 signs the share request to state he will join share. He creates his MSID key pair at this time. The signed response includes User 2's MSID public key.
10. Share map is encrypted or sent encrypted (possibly by secure messenger) to User 1 along with the MSID public keys of any users of the share that exist. Note the transmittion of MSID public key may not be required as the MSID chunks are saved on the net as described in 3 so any user can check the public key at any time—this just saves the search operation on that chunk to speed the process up slightly.
11. Each user has details added to the share these include public name (MPID) and rights (read/write/delete/admin etc.)
12. A description of the share file Note that as each user saves new chunks he does so with the MSID keys, this means that if a shares is deleted or removed the chunks still exist in the users home database and he can have the option to keep the data maps and files as individual files or simply forget them all.

Note also that as a user opens a file, a lock is transmitted to all other shares and they will only be allowed to open a file read only—they can request unlock (i.e. another user unlocks the file—meaning it becomes read only). Non-logged in users will have a message buffered for them—if the file is closed the buffered message is deleted (as there is no point in sending it to the user now) and logged in users are updated also.

This will take place using the messenger component of the system to automatically receive messages from share users about shares (but being limited to that).

Provide Public ID (FIG. 1—P17)

According to a related aspect of this invention, a public and Private key pair is created for a network where preferably the user is anonymously logged on, and preferably has a changeable pseudo random private id which is only used for transmission and retrieval of ID blocks giving access to that network.

Preferably this public private key pair will be associated with a public ID. This ID will be transmittable in a relatively harmless way using almost any method including in the open (email, ftp, www etc.) but preferably in an encrypted form. Preferably this ID should be simple enough to remember such as a phone number type length. Preferably this ID will be long enough however, to cope with all the world's population and more, therefore it would be preferably approx 11 characters long.

This ID can be printed on business cards or stationary like a phone number or email address and cannot be linked to the users private ID by external sources. However the user's own private information makes this link by storing the data in the ID bit the user retrieves when logging in to the network or via another equally valid method of secure network authentication.

This ID can then be used in data or resource sharing with others in a more open manner than with the private id. This keeps the private ID private and allows much improved inter-node or inter-person communications.

Secure Communications (FIG. 1—P18)

According to a related aspect of this invention, the communications between nodes should be both private and validated. This is preferably irrefutable but there should be options for refutable communications if required. For irrefutable communications the user logs on to the network and retrieves their key pair and ID. This is then used to start communications. Preferably the user's system will seek another node to transmit and receive from randomly—this adds to the masking of the user's private ID as the private ID is not used in any handshake with network resources apart from logging in to the network.

As part of the initial handshake between users, a key may be passed. Preferably this is a code passed between users over another communications mechanism in a form such as a pin number known only to the users involved or it may be as simple as appending the user's name and other info to a communication request packet such as exists in some instant messaging clients today—i.e. David wants to communicate with you allow/deny/block.

Unlike many communications systems today, this is carried out on a distributed server-less network. This however provides the problem of what to do when users are off line. Today messages are either, stopped or stored on a server, and in many cases not encrypted or secured. This invention allows users to have messages securely buffered whilst off line. This is preferably achieved by the node creating a unique identifier for only this session and passing that ID to all known nodes in the user's address book. Users on-line get this immediately, users off-line have this buffered to their last known random ID. This ensures that the ability to snoop on a user's messages is significantly reduced as there is no identifier to people outside the address book as to the name of the random ID bit the messages are stored to. The random ID bit is preferably used as the first part of the identified buffer file name and when more messages are stored then another file is saved with the random id and a number appended to it representing the next sequential available number. Therefore a user will log on and retrieve the message sequentially. This allows buffered secured and distributed messaging to exist.

Document Signing (FIG. 1—P19)

According to a related aspect of this invention, a by-product of securing communications between nodes using asymmetric encryption is as previously stated, introducing a non-refutable link. This allows for not only messages between nodes to be non-refutable but also for documents signed in the same manner as messages to be non refutable. Today somebody can easily steal a user's password or purposely attack users as they are not anonymous; this invention provides a great deal of anonymity and backs this up with access to resources. Documents may be signed and passed as legally enforceable between parties as a contract in many countries.

Contract Conversations (FIG. 1—P20)

According to a related aspect of this invention, a conversation or topic can be requested under various contracted conditions. The system may have a non disclosure agreement as an example and both parties digitally sign this agreement automatically on acceptance of a contract conversation. In this case a non disclosure conversation. This will preferably speed up and protect commercial entities entering into agreements or where merely investigating a relationship. Preferably other conditions can be applied here such as preferably full disclosure conversations, Purchase order conversations, contract signing conversations etc. This is all carried out via a system preferably having ready made enforceable contracts for automatic signing. These contracts may preferably be country or legal domain specific and will require to be enforceable under the law of the countries where the conversation is happening. This will require the users to preferably automatically use a combination of geographic IP status and by selecting which is their home country and where are they are at that time located and having that conversation.

Preferably only the discussion thread is under this contract, allowing any party to halt the contract but not the contents of the thread which is under contract.

Figure 19:
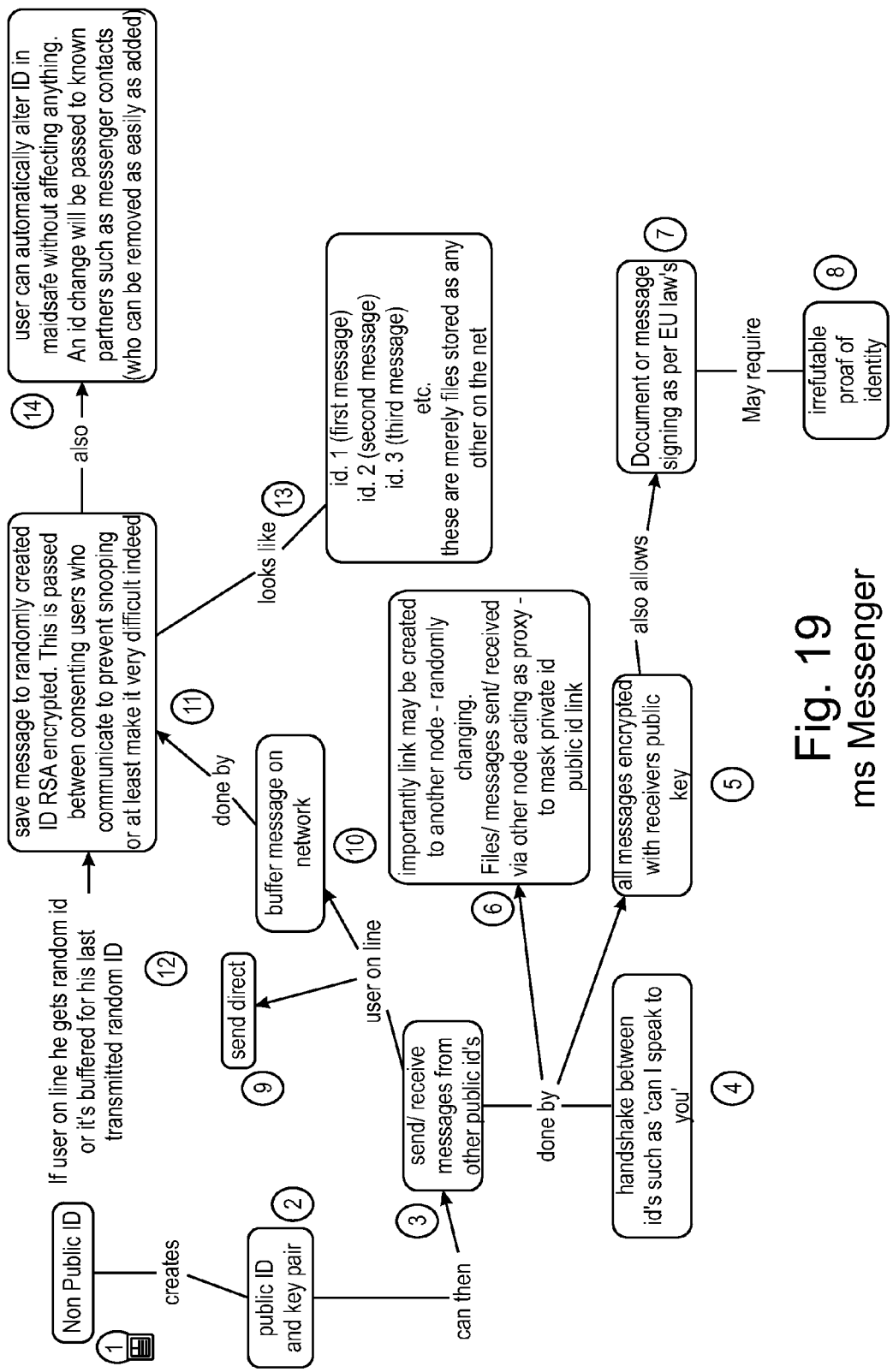

Preferably there can also be a very clear intent statement for a conversation that both parties agree to. This statement will form the basis of a contract in the event of any debate. The clearer the intent statement is; the better for enforceability. These conversations are potentially not enforceable but should lead to simplifying any resolution required at a later date. Preferably this can be added together with an actual contract conversation such as a non disclosure agreement to form a pack of contracts per conversation. Contract conversations will be clearly identified as such with copies of the contracts easily viewable by both parties at any time, these contracts will preferably be data maps and be very small in terms of storage space required.

ms_messenger (FIG. 1—PT6 and FIG. 19)

1. A non public ID preferably one which is used in some other autonomous system is used as a sign in mechanism and creates a Public ID key pair.

2. The user selects or creates their public ID by entering a name that can easily be remembered (such as a nickname) the network is checked for a data element existing with a hash of this and if not there, this name is allowed. Otherwise the user is asked to choose again.

3. This ID called the MPID (maidsafe.net public ID) can be passed freely between friends or printed on business cards etc. as an email address is today.

4. To initiate communications a user enters the nickname of the person he is trying to communicate with along with perhaps a short statement (like a prearranged pin or other challenge). The receiver agrees or otherwise to this request, disagreeing means a negative score starts to build with initiator. This score may last for hours, days or even months depending on regularity of refusals. A high score will accompany any communication request messages. Users may set a limit on how many refusals a user has prior to being automatically ignored.

5. All messages now transmitted are done so encrypted with the receiving party's public key, making messages less refutable.

6. These messages may go through a proxy system or additional nodes to mask the location of each user.

7. This system also allows document signing (digital signatures) and interestingly, contract conversations. This is where a contract is signed and shared between the users. Preferably this signed contract is equally available to all in a signed (non changeable manner) and retrievable by all. Therefore a distributed environment suits this method. These contracts may be NDAs Tenders, Purchase Orders etc.

8. This may in some cases require individuals to prove their identity and this can take many forms from dealing with drivers licenses to utility bills being signed off in person or by other electronic methods such as inputting passport numbers, driving license numbers etc.

9. If the recipient is on line then messages are sent straight to them for decoding.

10. If the recipient is not on line, messages are require to be buffered as required with email today.

11. Unlike today's email though, this is a distributed system with no servers to buffer to. In maidsafe.net messages are stored on the net encrypted with the receiver's public key. Buffer nodes may be known trusted nodes or not.

12. Messages will look like receivers id. message 1. message 2 or simply be appended to the users MPID chunk, in both cases messages are signed by the sender. This allows messages to be buffered in cases where the user is offline. When the user comes on line he will check his ID chunk and look for appended messages as above ID.message1 etc. which is MPID.<message 1 data>.<message 2 data> etc This system allows the ability for automatic system messages to be sent, i.e. . . . in the case of sharing the share, data maps can exist on everyone's database and never be transmitted or stored in the open. File locks and changes to the maps can automatically be routed between users using the messenger system as described above. This is due to the distributed nature of maidsafe.net and is a great, positive differentiator from other messenger systems. These system commands will be strictly limited for security reasons and will initially be used to send alerts from trusted nodes and updates to share information by other shares of a private file share (whether they are speaking with them or not).

The best way within our current power to get rid of email spam is to get rid of email servers.

Anonymous Transactions (FIG. 1—P24)

According to a related aspect of this invention, the ability to transact in a global digital medium is made available with this invention. This is achieved by passing signed credits to sellers in return for goods. The credits are data chunks with a given worth preferably 1, 5, 10, 20, 50, 100 etc. units (called cybers in this case). These cybers are a digital representation of a monetary value and can be purchased as described below or earned for giving up machine resources such as disk space of cpu time etc. There should be preferably many ways to earn cybers.

A cyber is actually a digitally signed piece of data containing the value statement i.e. 10 cybers and preferably a serial number. During a transaction the seller's serial number database is checked for validity of the cyber alone. The record of the ID used to transact is preferably not transmitted or recorded. This cyber will have been signed by the issuing authority as having a value. This value will have been proven and preferably initially will actually equate to a single currency for instance linked to a Euro. This will preferably alter through time as the system increases in capability.

Some sellers may request non anonymous transactions and if the user agrees he will then use the public ID creation process to authenticate the transaction and may have to supply more data. However there may be other sellers who will sell anonymously. This has a dramatic effect on marketing and demographic analysis etc. as some goods will sell anywhere and some will not. It is assumed this system allows privacy and freedom to purchase goods without being analysed.

The process of transacting the cybers will preferably involve a signing system such that two people in a transaction will actually pass the cyber from the buyer to the seller. This process will preferably alter the signature on the cyber to the seller's signature. This new signature is reported back to the issuing authority.

Interface with Non-Anonymous Systems (FIG. 1—P23)

According to a related aspect of this invention, people may purchase digital cash or credits from any seller of the cash. The seller will preferably create actual cash data chunks which are signed and serialised to prevent forgery. This is preferably accountable as with today's actual cash to prevent fraud and counterfeiting. Sellers will preferably be registered centrally in some cases. The users can then purchase cybers for cash and store these in their database of files in a system preferably such as maidsafe.net.

As a cyber is purchased it is preferably unusable and in fact simply a reference number used to claim the cyber's monetary value by the purchaser's system. This reference number will preferably be valid for a period of time. The purchaser then logs in to their system such as maidsafe.net and inputs the reference number in a secure communications medium as a cyber request. This request is analysed by the issuing authority and the transaction process begins. Preferably the cyber is signed by the issuing authority that then preferably encrypts it with the purchaser's public key and issues a signing request. The cyber is not valid at this point. Only when a signed copy of the cyber is received by the issuing authority is the serial number made valid and the cyber is live.

This cyber now belongs to the purchaser and validated by the issuer. To carry out a transaction this process is preferably carried out again i.e. the seller asks for payment and a cyber signed by the buyer is presented—this is validated by checking with the issuer that the serial code is valid and that the buyer is the actual owner of the cyber. Preferably the buyer issues a digitally signed transaction record to the issuing authority to state he is about to alter that cyber's owner. This is then passed to the seller who is requested to sign it. The seller then signs the cyber and requests the issuing authority to accept him as new owner via a signed request. The authority then simply updates the current owner of the cyber in their records.

These transactions are preferably anonymous, as users should be using a private id to accomplish this process. This private ID can be altered at any time but the old id should be saved to allow cyber transactions to take place with the old id.

Anonymity (FIG. 1—P25)

According to a related aspect of this invention, a system of voting which is non refutable and also anonymous is to be considered. This is a requirement to allow free speech and thinking to take place on a global scale without recrimination and negative feedback as is often the case.

To partake in a vote the user will have to be authenticated as above then preferably be presented with the issue to be voted on. The user will then use a private ID key to sign their vote anonymously. Preferably non anonymous irrefutable voting may also take place in the system by simply switching from a private ID to a public one. This will preferably form the basis of a petition based system as an add-on to the voting system.

The system will require that a block of data can be published (preferably broadcast to each user via messenger) and picked up by each user of the system and presented as a poll. This poll will then be signed by the user and sent back to the poll issuer whose system will count the votes and preferably show a constant indication of the votes to date.

As there are public and private IDs available, then each vote will require preferably only ONE ID to be used to prevent double voting. Preferably geographic IP may be used to establish geographic analysis of the voting community particularly on local issues.

Figure 20:
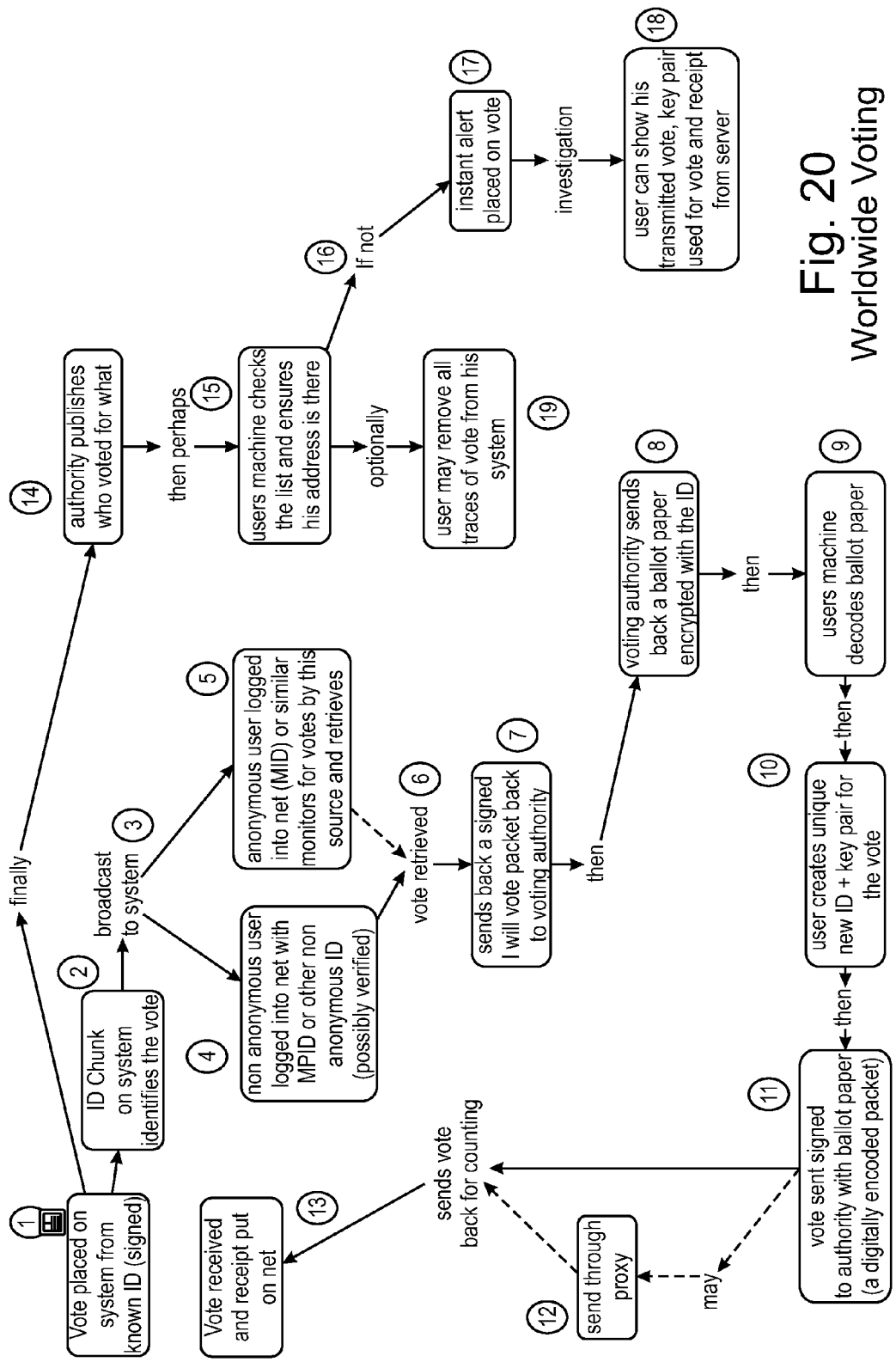

Voting System (FIG. 1—PT8 and FIG. 20)

1. A vote is created in a normal fashion; it could be a list of candidates or a list of choices that users have to select. Preferably this list will always have an "I do not have enough information" option appended to the bottom of the list—to ensure voters have sufficient knowledge to make a decision. A limit on the last option should be stipulated as a limit to void the vote and redo with more information.

2. This vote is stored on the system with the ID of the voting authority. This may be a chunk of data called with a specific name and digitally signed for authenticity. All storage nodes may be allowed to ensure certain authorities are allowed to store votes, and only store votes digitally signed with the correct ID.

3. A system broadcast may be used to let everyone interested know that there is a new vote to be retrieved. This is an optional step to reduce network congestion with constant checking for votes; other similar systems may be used for the same ends.

4. A non anonymous user logged into the net will pick up the vote. This is a user with a public ID known at least to the authority. The vote may in fact be a shared chunk that only certain IDs have access to or know of its location (i.e. split onto several component parts and a messaging system used to alert when votes are ready.)

5. An anonymous user may be logged onto the net and may in fact use a random ID to pick up the vote.

6. The vote is retrieved.

7. The system will send back a signed (with the ID used to pick up the vote) "I accept the vote".

8. The voting authority will transmit a ballot paper—i.e. a digitally signed (and perhaps encrypted/chunked) ballot paper. This may be a digitally signed "authorisation to vote" slip which may or may not be sequentially numbered or perhaps a batch of x number of the same serial numbers (to prevent fraud by multiple voting from one source—i.e. issue 5 same numbers randomly and only accept 5 votes with that number).

9. User machine decrypts this ballot paper.

10. The users system creates a one time ID+key pair to vote. This public key can be hashed and stored on the net as with a MAID or PMID so as to allow checking of any signed or encrypted votes sent back.

11. The vote is sent back to the authority signed and preferably encrypted with the authority's public key.

12. In the case of anonymous or non anonymous voting this may be further masqueraded by passing the vote through proxy machines en route.

13. The vote is received and a receipt chunk put on the net. This is a chunk called with the user's temp (or voting) ID hash with the last bit shifted or otherwise knowingly mangled—so as not to collide with the voting ID bit the user stores for authentication of their public key.

14. The authority can then publish a list of who voted for what (i.e. a list of votes and the voting ID's)

15. The user's system checks the list for the ID that was used being present in the list and validates that the vote was cast properly.

If this is not the case.

16. The users system issues an alert. This alert may take many forms and may include signing a vote alert packet; this can be a packed similarly (as in 13,) altered to be a known form of the vote chunk itself. There are many forms of raising alerts including simply transmitting an electronic message through messenger or similar and possibly to a vote authentication party and not necessarily the voting authority themselves.

17. The user has all the information to show the party investigating voting authenticity, accuracy, legality or some other aspect, thereby allowing faults and deliberately introduced issues to be tracked down.

18. The user has the option to remove all traces of the vote from his system at this time.

Proven Individual (FIG. 1—P26)

According to a related aspect of this invention, using a system of anonymous authentication preferably as in maidsafe.net, the first stage is partially complete and individual accounts are authentic but this does not answer the question of anonymous individuals, this is described here.

Access to a system can be made with information that we possess (passwords etc.) or something that we physically have (iris/fingerprint or other biometric test). To prove an individual's identity the system will preferably use a biometric test. This is a key to the voting system as it becomes more broadly adopted. It is inherent in this system that any personally identifying data must be kept secret, and also that any – 2086—passwords or access control information is never transmitted.

When a user authenticates, the system can recognise if they have done so biometrically. In this case, the account is regarded as a unique individual rather than an individual account. This is possible as maidsafe.net can authenticate without accessing servers or database records of a biometric nature for example.

As a user logs into maidsafe.net through a biometric mechanism then the state of login is known so no login box is presented for typing information in to access the system. This allows the system to guarantee that the user has logged in biometrically. The system on each machine is always validated by maidsafe.net on login to ensure this process cannot be compromised.

Preferably some votes will exist only for biometrically authenticated users.

Distributed Controlled Voting (FIG. 1—P29)

According to a related aspect of this invention, to further manage the system there has to be a level of control as well as distribution to enable all users to access it at any time. The distribution of the votes is controlled as system messages and stored for users using the messenger system described earlier.

The main issue with a system such as this would be 'what' is voted on and 'who' poses the votes and words polls. This is key to the fairness and clarity of the system and process. This voting system will preferably always have a 'not enough information' selection to provide a route by which users are able to access information so that they are well informed before making any decision.

The system will require a group of individuals, who are preferably voted into office by the public as the policyholders/ trustees of the voting system. This group will be known by their public ID and use their public ID to authenticate and publish a poll. This group will preferably be voted into office for a term and may be removed at any time via a consensus of the voting public. For this reason there will be continual polls on line which reflect how well the policyholders are doing as a group and preferably individually as well.

According to a related aspect of this invention, users of the system will input to the larger issues on the system. Macro management should be carried out via the policyholders of the system, whom as mentioned previously may be voted in or out at any time, however larger issues should be left to the users. These issues can preferably be what licenses are used, costs of systems, dissemination of charitable contributions, provision to humanitarian and scientific projects of virtual computing resources on large scales etc.

To achieve this, preferably a system message will be sent out, where it is not presented as a message but as a vote. This should show up in the users voting section of the system. User private IDs will be required to act on this vote and they can make their decision.

There will be appeals on these votes when it would be apparent that conclusion of the vote is dangerous to either a small community or the system as a whole. Users will have an option of continuing with the vote and potential damage but essentially the user will decide and that will be final. Preferably this system does not have a block vote or any other system which rates one individual over another at any time or provides an advantage in any other way. This requires no ability to allow veto on any decision or casting of votes by proxy so that the authenticated user's decision is seen as properly recorded and final.

According to a related aspect of this invention, a system of perpetual data, self encrypting files and data mapping will allow a global anonymous backup and restore system for data to exist. This system can be constructed from the previous discussions where data may be made perpetual on a network and anonymously shared to prevent duplication. This together with the ability to check, manipulate and maintain revision control over files adds the capability of a 'time machine' type environment where data may be time stamped on backup.

This allows a system to rebuild a user's data set as it was at any time in history since using maidsafe.net or similar technologies. This may form a defence at times where in cases like prior art enquiries, insider dealing etc. is being considered, as the system is secure and validated by many other nodes etc. It can therefore be shown what knowledge (at least from the point of view of owning the data pertaining to a subject,) anyone had of certain circumstances.

According to a related aspect of this invention, preferably using aspect(s) previously defined or any that may improve this situation. Taking distributed authentication, backup and restore along with data map sharing; the system can add to this the ability for granular access controls. In this case a node entering the network will request an authenticator to authorise its access. In this case the authenticator will be a manager or equivalent in an organisation (whether matrix managed or traditional pyramid). This authorisation will tie the public ID of the authoriser to the system as having access to this node's data and any other authorisations they make (in an authorisation chain).

This allows an environment of distributed secure backup, restore and sharing in a corporate or otherwise private environment.

According to a related aspect of this invention, all of the capabilities described here with the exception of the above will ensure that a network of nodes can be created, in which users have security privacy and freedom to operate.

These nodes will have refutable IDs (MAID, PMID etc.) as well as non refutable IDs (MPID) for different purposes, just as in human life in general there is time to be identified and times when it is just best not to be.

According to a related aspect of this invention, adding the ability of non refutable messaging allows users to not only communicate genuinely and securely but also the ability to communicate under contracted terms. This allows for the implementation of legally kept trade secrets (as implied with NDA agreements etc.) plus many more contracted communications. This will hopefully lessen the burden on legal issues such as litigation etc.

According to a related aspect of this invention, adding the ability to create two voting systems, anonymous and non-anonymous, allows the system to provide a mechanism for instant democracy. This is achieved by allowing a voting panel in a user's account that is constantly updated with issues regarding the system and it's improvements initially. These votes will be anonymous.

In another anonymous voting scenario users may continually vote on certain subjects (as in a running poll) these subjects could be the leaders of boards etc.

In a non anonymous voting scenario it may be there's groups of identified people (via their MPID) who have a common grouping such as a charity or similar and they may require certain people to vote on certain matters and be recognised. This is where the MPID is used for voting.

According to a related aspect of this invention, adding to this the ability to collect and trade credits anonymously allows users to sell machine resources they are not using, trade on a network with a cash equivalent and go about there business on a network as they do in real life.

The invention claimed is:

1. A method of protecting data in a peer-to-peer network of a plurality of nodes, comprising:
splitting the data into a plurality of data chunks of one or more sizes, wherein the one or more sizes are randomly calculated based on the data;
obfuscating first, second and third data chunks of the plurality of data chunks by swapping a first byte of the first data chunk with a first byte of the second data chunk, a second byte of the second data chunk with a first byte of the third data chunk, and a second byte of the third chunk with the second byte of the first chunk till all bytes of the first, second and third data chunks are swapped, and repeating the swapping by same number of times as there are chunks, wherein obfuscating the data chunks leads to mixing UP of content of the data chunks, thereby ensuring that the data is rendered useless without presence of all the data chunks; and
encrypting the plurality of obfuscated data chunks, wherein a hash value of a given data chunk of the plurality of obfuscated data chunks is used as an input to an encryption algorithm to encrypt a next given data chunk of the plurality of obfuscated data chunks; and
naming the plurality of encrypted obfuscated data chunks using corresponding hash values of the data chunks.

2. The method as claimed in claim 1, wherein the encryption algorithm is a symmetric encryption algorithm.

3. The method as claimed in claim 1, further comprising storing the plurality of encrypted data chunks on the plurality of nodes of the peer-to-peer network.

4. The method as claimed in claim 3, including determining if each chunk of the data already exist on the network, and if each chunk of the data already exists, not storing the protected data.

5. The method as claimed in claim 1, further comprising storing the hash values of the plurality of obfuscated data chunks and corresponding plurality of encrypted data chunks in at least one user location for future decryption.

6. The method as claimed in claim 3, further comprising searching an encrypted data chunk in the peer-to-peer network based on a corresponding hash value.

7. The method as claimed in claim 1, wherein encrypting the first data chunk of the plurality of obfuscated data chunks comprises:
 determining hash values of the second and third data chunks of the plurality of obfuscated data chunks;
 applying the modulo division technique to the hash value of the second data chunk and first predefined number of bytes of the hash value of the third data chunk to generate a random number; and
 using the random number and the hash value of the second data chunk to encrypt the first data chunk.

8. The method as claimed in claim 3, further comprising checking existence of each encrypted data chunk in the peer-to-peer network using a distributed hash table network, to ascertain that the data has been backed up.

9. The method as claimed in claim 8, further comprising creating a new set of data chunks from the data when at least one encrypted data chunk of the data is not present in the peer-to-peer network.

10. A method of protecting data in a peer-to-peer network of a plurality of nodes, the method comprising:
 splitting the data into a plurality of data chunks of one or more sizes, wherein the one or more sizes are randomly calculated based on the data;
 obfuscating first, second and third data chunks of the plurality of data chunks by swapping a first byte of the first data chunk with a first byte of the second data chunk, a second byte of the second data chunk with a first byte of the third data chunk, and a second byte of the third chunk with the second byte of the first chunk till all bytes of the first, second and third data chunks are swapped, and repeating the swapping by same number of times are there are chunks, wherein the obfuscating the first, second and third data chunks leads to mixing up of corresponding content, thereby ensuring that the data is rendered useless without presence of the first, second and third data chunks;
 encrypting the plurality of obfuscated data chunks, wherein the encrypting the first data chunk of the plurality of obfuscated data chunks comprising:
  determining hash values of the second and third data chunks of the plurality of obfuscated data chunks;
  applying the modulo division technique to the hash value of the second data chunk and first predefined number of bytes of the hash value of the third data chunk to generate a random number; and
  using the random number and the hash value of the second data chunk to encrypt the first data chunk;
 naming the plurality of encrypted obfuscated data chunks using corresponding hash values;
 storing the plurality of encrypted data chunks on the plurality of nodes;
 searching an encrypted data chunk in the peer-to-peer network based on a corresponding hash value and checking existence of each encrypted data chunk in the peer-to-peer network to ascertain that the data has been backed up; and
 creating a new set of data chunks from the data, when at least one encrypted data chunk is not found.

11. The method as claimed in claim 10, wherein the encryption algorithm is a symmetric encryption algorithm.

12. The method as claimed in claim 10, further comprising storing the hash values of the plurality of obfuscated data chunks and corresponding plurality of encrypted data chunks in a predetermined user location for future decryption.

13. A method of protecting data in a peer-to-peer network of a plurality of nodes, the method comprising:
 splitting the data into a plurality of data chunks of one or more sizes, wherein the one or more sizes are calculated based on the data;
 obfuscating data chunks of the plurality of data chunks by swapping at least one byte of pairs of data chunks, wherein the obfuscating the data chunks leads to mixing up of corresponding content, thereby ensuring that the data is rendered useless without presence of the chunks;
 encrypting the plurality of obfuscated data chunks, wherein the encrypting a first data chunk of the plurality of obfuscated data chunks comprising:
  determining hash values of second and third data chunks of the plurality of obfuscated data chunks;
  applying the modulo division technique to the hash value of the second data chunk and first predefined number of bytes of the hash value of the third data chunk to generate a random number; and
  using the random number and the hash value of the second data chunk to encrypt the first data chunk;
 naming the plurality of obfuscated data chunks using corresponding hash values;
 storing the plurality of encrypted data chunks on the plurality of nodes;
 searching an encrypted data chunk in the peer-to-peer network based on a corresponding hash value and checking existence of each encrypted data chunk in the peer-to-peer network to ascertain that the data has been backed up; and
 creating a new set of data chunks from the data, when at least one encrypted data chunk is not found.

* * * * *